(12) United States Patent
Smith et al.

(10) Patent No.: US 11,796,379 B2
(45) Date of Patent: Oct. 24, 2023

(54) APPARATUS AND METHODS FOR PLANT PROPAGATION WEIGHT MEASUREMENT

(71) Applicant: MJNN LLC, South San Francisco, CA (US)

(72) Inventors: Damon Smith, Laramie, WY (US); Kevin Grauberger, Laramie, WY (US); Aunders Hallsten, Cheyenne, WY (US)

(*) Notice: Subject to any disclaimer, the term of this patent is extended or adjusted under 35 U.S.C. 154(b) by 223 days.

(21) Appl. No.: 17/327,501

(22) Filed: May 21, 2021

(65) Prior Publication Data

US 2021/0364337 A1 Nov. 25, 2021

Related U.S. Application Data

(60) Provisional application No. 63/029,148, filed on May 22, 2020.

(51) Int. Cl.
| | | |
|---|---|---|
| *G01G 3/14* | (2006.01) | |
| *G01G 19/414* | (2006.01) | |
| *G01G 19/52* | (2006.01) | |
| *G01G 21/22* | (2006.01) | |
| *A01G 9/02* | (2018.01) | |
| *A01G 9/029* | (2018.01) | |

(52) U.S. Cl.
CPC ............ *G01G 3/14* (2013.01); *A01G 9/029* (2018.02); *G01G 19/4144* (2013.01); *G01G 19/52* (2013.01); *G01G 21/22* (2013.01)

(58) Field of Classification Search
CPC .......... G01G 3/14; G01G 19/52; G01G 21/22; G01G 21/23; G01G 19/44; G01G 19/414; G01G 19/4144; A01G 9/029–033
See application file for complete search history.

(56) References Cited

U.S. PATENT DOCUMENTS

| | | | | |
|---|---|---|---|---|
| 4,387,777 A | * | 6/1983 | Ash ...................... | G01G 21/23 177/1 |
| 4,420,052 A | * | 12/1983 | Hale ..................... | G01G 19/52 177/132 |
| 4,482,783 A | * | 11/1984 | Laimins ................ | G01G 19/14 177/211 |
| 5,033,563 A | * | 7/1991 | Brainerd, Jr. ........ | G01G 19/445 177/132 |
| 6,854,337 B1 | * | 2/2005 | Tarara ................... | G01G 19/414 73/826 |
| 7,348,501 B1 | * | 3/2008 | Nugent, Jr. ........... | G01G 21/23 177/199 |
| 10,918,031 B2 | * | 2/2021 | Millar ................... | A01G 31/042 |

* cited by examiner

*Primary Examiner* — Randy W Gibson
(74) *Attorney, Agent, or Firm* — Patterson + Sheridan

(57) ABSTRACT

Embodiments described herein relate to plant propagation weight measurement apparatus and methods. Load cells are utilized to measure one or more of seedling trays, flood tables, support systems, and combinations thereof. The load cells are integrated in weight measurement systems and configured to enable weight detection of various system components. In certain embodiments, load cells are utilized to measure stationary system components. In other embodiments, load cells are utilized to measure conveyed system components.

17 Claims, 13 Drawing Sheets

APPARATUS AND METHODS FOR PLANT PROPAGATION WEIGHT MEASUREMENT

CROSS-REFERENCE TO RELATED APPLICATIONS

This application claims priority to U.S. Provisional Patent Application No. 63/029,148, filed May 22, 2020, the entirety of which is herein incorporated by reference.

BACKGROUND

Field

Embodiments of the present disclosure generally relate to indoor agriculture systems. More specifically, embodiments of the present disclosure relate to apparatus and methods for plant propagation weight measurement.

Description of the Related Art

Conventional agricultural practices have evolved rapidly over the twentieth century to what can now be considered a fast-moving high-tech industry. Global food shortages, climate change, a societal changes instigated a transition from manually implemented agriculture techniques toward advanced farming methods, such as mechanized and automated farming. While conventional agricultural practices often limit a farmer to one growing season, indoor farming can eliminate environmental constraints and increase crop production. Controlled environment agriculture, or indoor farming, often implements data processing technologies and many advances, such as crop yield and the like, can be gained by utilizing such technologies.

However, commercial scale controlled environment agriculture is still in its relative infancy when compared to conventional agricultural practices. Although there exists great potential for data collection and analysis of various aspects of controlled environment agriculture, such technologies are not well developed. For example, the ability to efficiently and accurately measure crop yields and other plant growth data remains difficult even within controlled environment agriculture systems.

Accordingly, what is needed in the art are improved metrology apparatus for controlled environment agriculture systems.

SUMMARY

In one embodiment, a weight measurement apparatus of provided. The apparatus includes a platform having a body which includes a first member and a second member. The second member is disposed substantially perpendicular to the first member, a hinge is coupled between the first member and the second member, a load cell is disposed adjacent to eh second member of the body opposite the first member, and a structuring element is coupled to the load cell.

In another embodiment, a weight measurement apparatus if provided. The apparatus includes a platform having a body which includes a first end and a second end disposed opposite the first end. A first load cell is coupled to the body adjacent to the first end of the body, a second load cell is coupled to the body adjacent to the second end of the body, and one or both of a seedling tray or flood table are disposed on a top surface of the body between the first end and the second end.

In another embodiment, a plant carrier weight measurement system is provided. The system includes a plant carrier and a first tension-type load cell coupled adjacent to a first end of the plant carrier. The first tension-type load cell is coupled to a top surface of the plant carrier by a first connector and to a structuring element by a second connector. A second tension-type load cell is coupled adjacent to a second end of the plant carrier opposite the first end and the second tension-type load cell is coupled to the top surface of the plant carrier by a third connector and to the structuring element by a fourth connector.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments described herein relate to plant propagation weight measurement apparatus and methods. Load cells are utilized to measure one or more of seedling trays, flood tables, tray racks, and combinations thereof. The load cells are integrated in weight measurement systems configured to enable weight detection of various system components. In certain embodiments, load cells are utilized to measure stationary system components. In other embodiments, load cells are utilized to measure conveyed system components.

Figure 1:
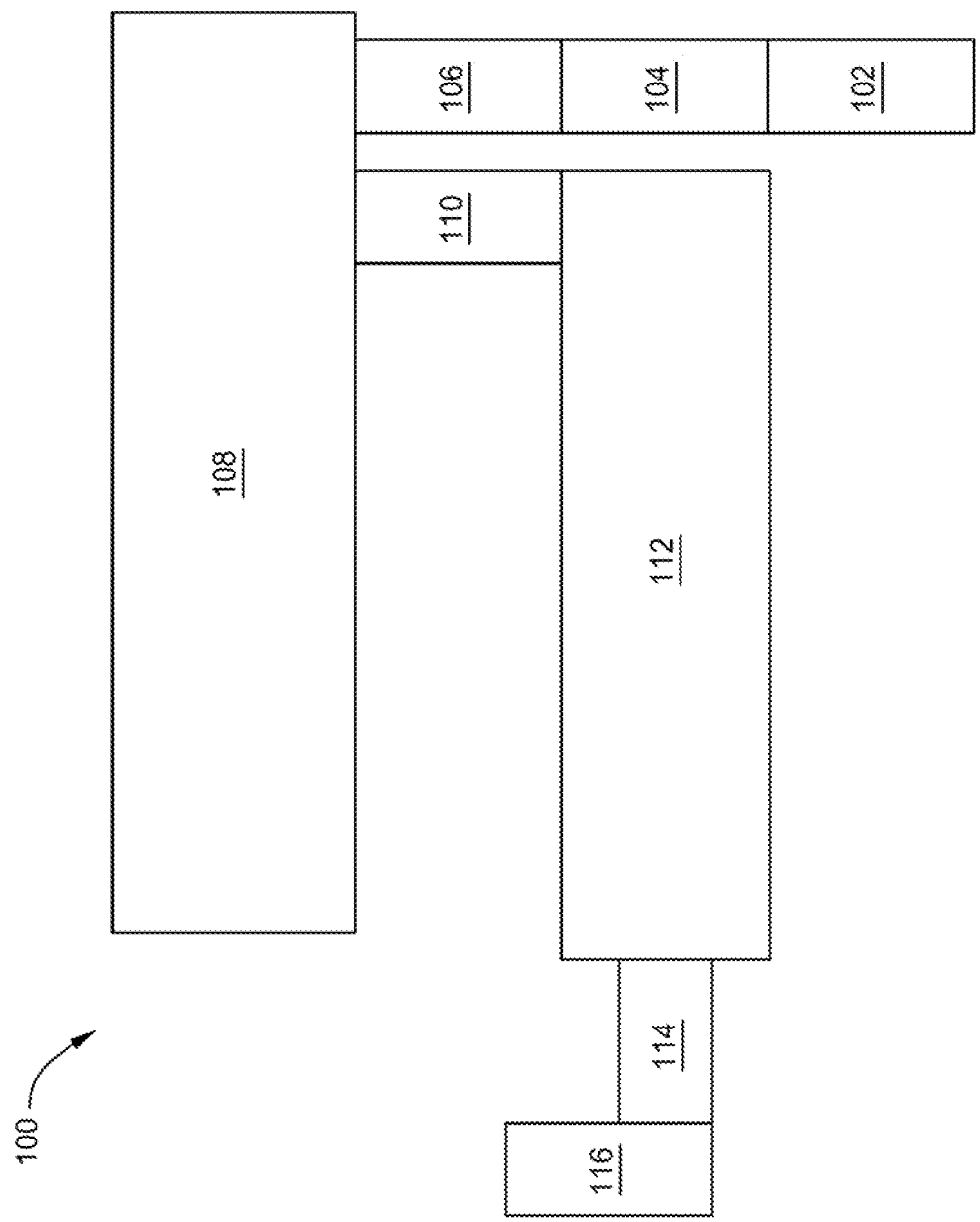
FIG. 1 illustrates a schematic plan view of a propagation system according to an embodiment of the disclosure.

FIG. 1 illustrates a schematic plan view of a propagation system 100 according to an embodiment of the disclosure. The propagation system 100 includes a seeding station 102, a first conveyor 104, a loading station 106, a germination station 108, a second conveyor 110, a propagation station 112, a third conveyor 114, and an unloading station 116. The seeding station 102 includes apparatus, such as seeding robots or the like, for planting seeds within a growth media contained within apparatus suitable for transferring the seeds through the system 100. For example, seeds are planted in a seedling tray at the seeding station 102.

Figure 2:
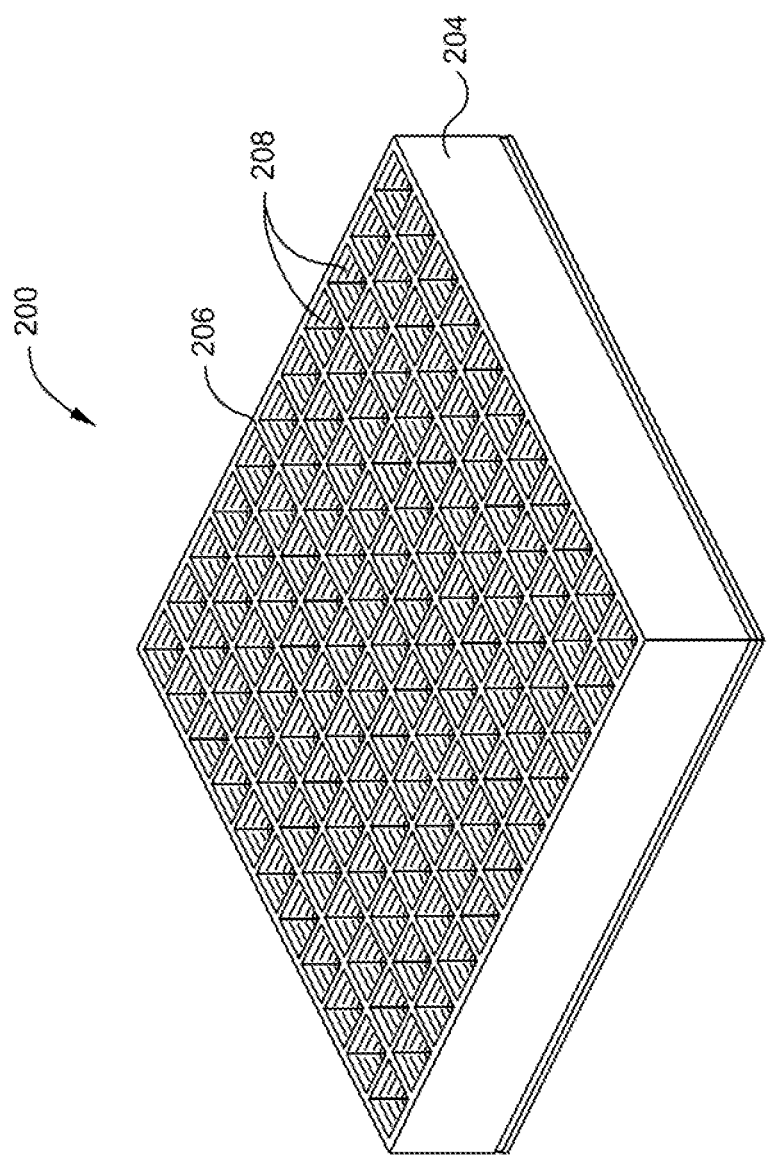
FIG. 2 illustrates a perspective view of a seedling tray according to an embodiment of the disclosure.

FIG. 2 illustrates a perspective view of a seedling tray 200 according to an embodiment of the disclosure. The seedling tray 200 includes a plurality of sidewalls 204 and dividers 206 which extend between the plurality of sidewalls 204. The sidewalls 204 and/or dividers 206 partition the seedling tray 200 into cells 208. The cells 208 include sidewalls and a bottom to support a growth media disposed therein. Although not illustrated, each cell 208 has an aperture or other opening formed in a bottom of the cell 208 to facilitate fluid flow into and out of the cell 208.

In one embodiment, the seedling tray 200 is fabricated from a polymeric materials, such as a plastic material or the like. However, other materials, such as metallic materials, may be utilized. In one embodiment, the material selected to fabricate the seedling tray 200 is impervious to water or nutrient containing fluids when contacted with such fluids. Such materials typically do not absorb water or nutrient fluids to maintain the structural integrity of the seedling tray 200. In certain embodiments, the seedling tray 200 or portions thereof such as the cells 208, are fabricated from one or more of the aforementioned materials in a mesh morphology. The mesh size is selected based upon the growing media, desired drainage or fluid uptake rate desired, or other variables that may impact plant or seed growth characteristics. Each cell 208 is filled with a growth media and one or more seeds are planted within each cell 208.

Examples of suitable growth media include, but are not limited to, soil, sand, peat, gravel, perlite, vermiculite, expanded shale, expanded clay, coconut husks, mineral wool, organic matter, and combinations and mixtures thereof.

In one embodiment, each cell 208 has an area of between about 0.5 square inches and about 4 square inches, such as between about 1 square inch and about 2 square inches. While the cells 208 are illustrated as being substantially square, it is contemplate the cells 208 may be other suitable shapes, such as rectangular and circular or the like. Similarly, although the seedling tray 200 is illustrated as being substantially square, other suitable shapes may be utilized. In one example, the seedling tray 200 is rectangular.

Referring back to FIG. 1, after planting of seeds within the seedling trays 200, the seedling trays 200 are transferred from the seeding station 102 via the first conveyor 104 to a leading station 106. At the loading station 106, the seedling trays 200 are placed in a flood table, such as the flood table described in detail with regard to FIG. 3. The flood table is sized to accommodate multiple seedling trays 200. A robot, crane, conveyor, or other suitable apparatus is utilized to position the seedling trays 200 in the flood table.

The flood table and seedling trays 200 are then moved from the loading station 106 to the germination station 108. The germination station 108 is a chamber or the like in which an environment adapted to promote germination is maintained. For example, temperature, humidity, and light variables may be controlled to promote germination of the seeds disposed in the seedling trays 200. In one example, the germination station 108 is maintained as a warm, humid, and dark environment.

After germination, the seedling trays 200 and flood tables are removed from the germination station 108 and transferred to the propagation station 112 by the second conveyor 110. The propagation station 112 is a chamber or the like in which an environment adapted to promote seedling growth is maintained. For example, light, nutrients, temperature, and humidity, among other variables, are controlled to facilitate growth of the seedlings. The seedling trays 200 and flood tables move through the propagation station 112 until the seedlings have matured enough to facilitate transplantation.

The seedling trays 200 and flood table exit the propagation station 112 and a robot, crane, or other suitable transfer apparatus places the seedling trays 200 and flood table on the third conveyor 114 which transfers the seedling trays 200 and flood table to the unloading station 116. The unloading station 115 includes a robot, crane, or other suitable transfer apparatus which unloads the seedlings trays 200 from the flood tables. A transplanter or other seedling transplant robot is then utilized to transfer seedlings from the seedling trays 200 to a vertical grow tower where the seedling is matured and subsequently harvested.

The aforementioned embodiments describe a flood table with seedling trays disposed therein moving through the propagation system 100. Alternatively, the flood tables within the propagation system 100 may be stationary and the seedling trays may be moved through or relative to the flood tables. The flood tables are positioned within the germination station 108 and/or the propagation station 112 depending upon desired irrigation characteristics of the seeds and seedlings. Examples of a stationary flood table and seedling tray conveyance system are described in detail with regard to FIGS. 7A-D, 8, and 9A-D.

Figure 3:
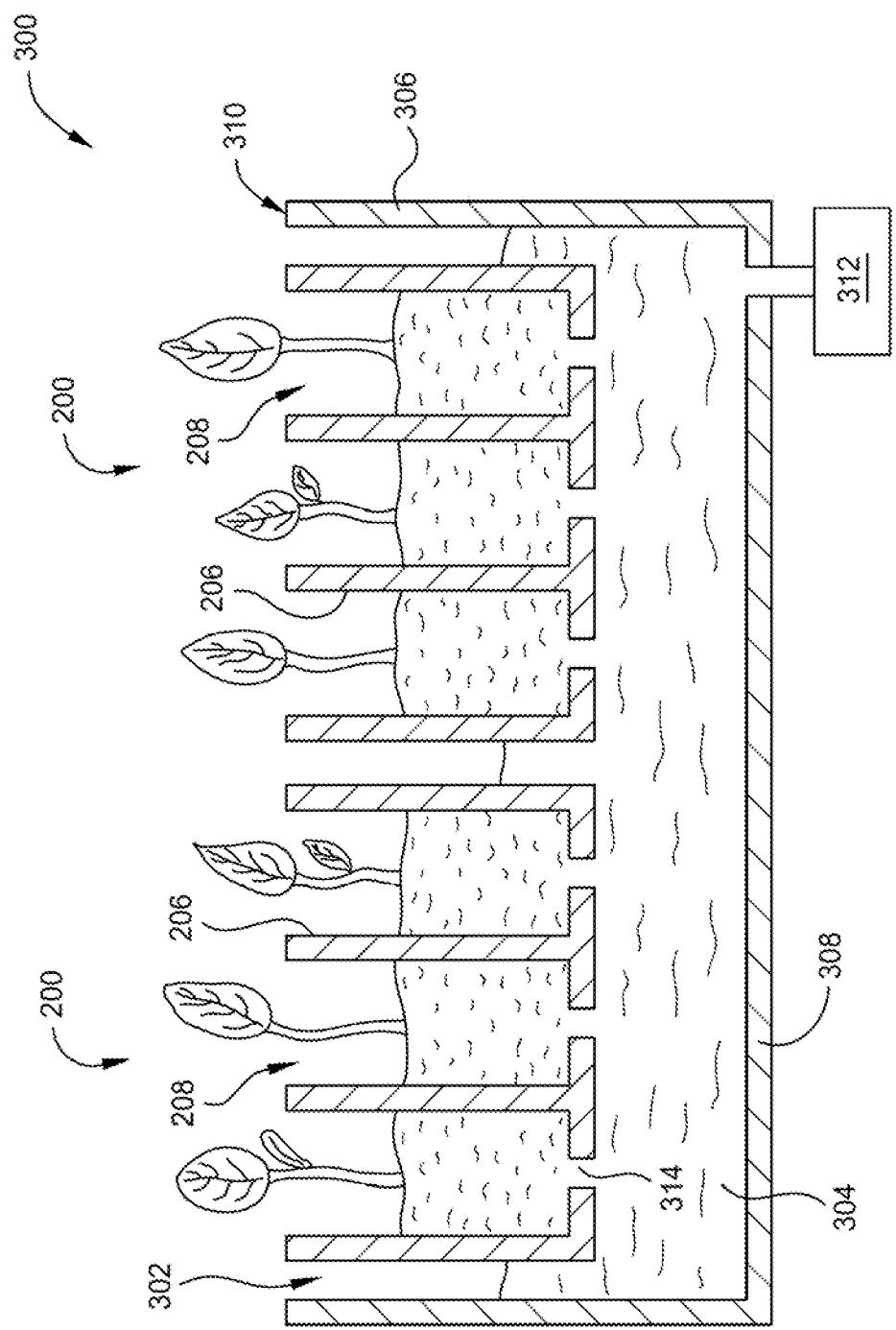
FIG. 3 illustrates a schematic cross-sectional view of a flood table with seedling trays according to an embodiment of the disclosure.

FIG. 3 illustrates a schematic cross-sectional view of a flood table 300 with seedling trays 200 according to an embodiment of the disclosure. The flood tray 300 includes a base 308 and sidewalls 306 extending from the base 308. In one embodiment, the sidewalls 306 extend at an angle substantially normal to a major axis of the base 308 such that an end 310 of the sidewalls 306 is disposed opposite the base 308. The base 308 and sidewalls 306 define a volume 302 therein. In one embodiment, the base 308 is square shaped. In another embodiment, the base 308 is rectangular shaped. It is contemplated that other suitable shapes may also be utilized, depending upon the desired implementation and overall system design.

The base 308 and sidewalls 306 are fabricated from a material having sufficient mechanical integrity to support a nutrient fluid 304 within the volume 302 and one or more seedling trays 200 therein. For example, the flood table 300 is fabricated from a metallic or polymer material. Examples of nutrient fluid 304 include water and other nutrients, such as phosphorous, nitrogen, potassium, calcium, magnesium, and sulfur, among others. In one embodiment, a drain 312 is formed in the base 308. The drain 312 is in fluid communication with the volume 302 and functions to introduce or remove the nutrient fluid 304 from the volume 302. For example, nutrient fluid 304 is introduced through the drain 312 to the volume 302 to irrigate seedlings disposed in the seedling trays 200. Apertures 314 in the seedling trays 200 enable the nutrient fluid 204 to irrigate the growth media and the seedling. When the seedlings have been sufficiently irrigated, the drain 312 is opened and the nutrient fluid 304 is removed from the volume 302. Alternatively, nutrient fluid 304 may remain in the volume 302 and the seedling trays 200 may be raised or elevated such that the apertures 314 are not submerged in the nutrient fluid 304.

The irrigation operations of flooding and draining the volume 302 are repeated at various intervals to maintain a desired state of seedling hydration. The seedling trays 200 are suspended in the volume 302, disposed in contact with the base 308, or spaced from the base 308 by a spacer or other structural member to enable flow of nutrient fluid 304 around the seedling trays 200. In other embodiments, the seedling trays 200 are submerged in the nutrient fluid 304 such that the nutrient fluid 304 over tops the dividers 206 to irrigate the seedlings. When the seedlings have been sufficiently irrigated, the apertures 314 of the seedling trays 200 are elevated above the nutrient fluid 304 to enable draining of the growth media or the nutrient fluid 304 may be removed from the volume 302 via the drain 312.

Figure 4A:
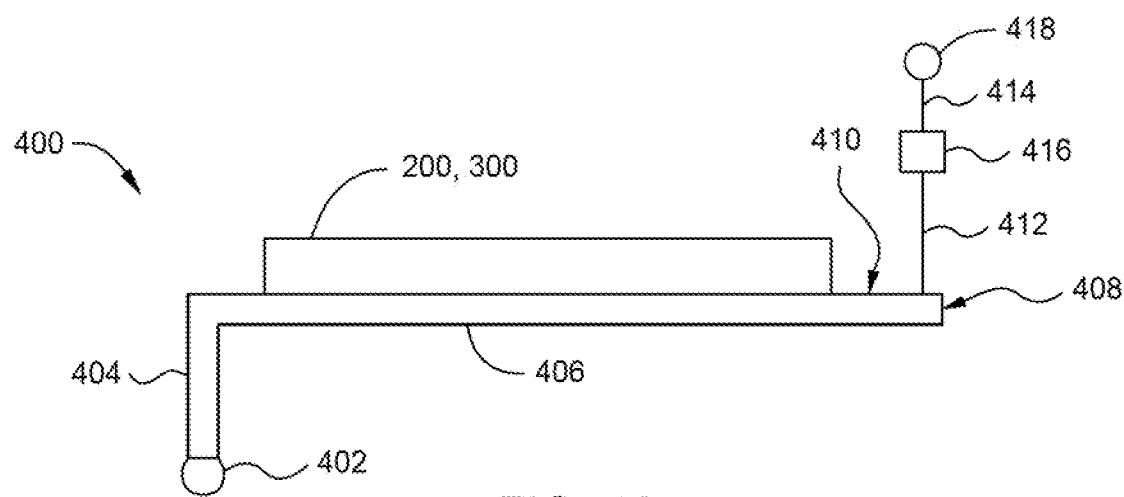
FIG. 4A illustrates a weight measurement system according to an embodiment of the disclosure.

FIG. 4A illustrates a weight measurement system 400 according to an embodiment of the disclosure. More specifically, FIG. 4A illustrates a schematic side view of the weight measurement system 400. The system 400 includes a first member 404 and a second member 406 which form a platform. The first member 404 and second member 406 function to provide a platform upon which a seedling tray 200 and/or flood table 300 are positioned for weight measurement. For example, the second member 406 may be a plate, tray, set or horizontal rails, or other surface sized to support a seedling tray 200 and/or flood table 300. The second member 406 may also include rails or other support apparatus adapted to support a seedling tray 200 and/or flood table 300. The first member 404 is a singular arm, extension, rod, or the like or may be a plurality of members coupled to the second member 406.

The first member 404 and second member 406 are fabricated from a metallic material or a polymeric material. In one embodiment, the first member 404 and the second member 406 are fabricated from the same material. In an alternative embodiment, the first member 404 and the second member 406 are fabricated from different materials. In one example, the system 400 is configured to measure the weight of a seedling tray 200. In another example, the system 400 is configured to measure the weight of a flood table 300. In another example, the system 400 is configured to measure the weight of a seedling tray 200 disposed in a flood table 300.

The first member 404 is coupled to a structuring element 402. The structuring element 402 is any suitable apparatus upon which the first member 404 is mounted. The structuring element 402 is a stationary structure which is adapted to support the first member 404 thereon. For example, the structuring element 402 may be a mount, stand, pedestal or the like which is bolted or otherwise affixed in a stationary position. In one embodiment, the structuring element 402 includes a joint which enables rotation about a Z-axis (extending into and out of the drawing). In one embodiment, the first member 404 extends vertically or substantially vertically from the structuring element 402. The second member 406 is coupled to and extends from the first member 404. In one example, a major axis of the second member 406 extends from the first member 404 in a plane substantially perpendicular to a major axis of the first member 404. In the example, the first member 404 and second member 406 from a right angle where the members 404, 406 meet. In one embodiment, the first member 404 and the second member 406 are distinct pieces coupled together, for example, by welding, bolts, or other fastening apparatus. Alternatively, the first member 404 and the second member 406 are a unitary structure.

A load cell 416 is coupled to the second member 406 adjacent to or at an end 408 of the second member 406. The end 408 of the second member 406 is disposed opposite the first member 404. The load cell 416 is coupled to the second member 406 by a first connector 412 and to a structuring element 418 by a second member 414. In one example, the first connector 412 is coupled to a top surface 410 of the second member 406. The structuring element 418 is positioned above the second member 406 and may be a stationary fixed apparatus, such as a rail, arm, or other superstructure which is adapted to support the weight of a seedling tray 200 and/or flood table 300 disposed on the second member 406. The first connector 412 and second connector 414 may be wires, ropes, rods, cables, or the like.

In operation, a seedling tray 200 and/or flood table 300 is positioned on the second member 406 and the weight of the seedling tray 200 and/or flood table 300 is applied as a load on the load cell 430 which is then utilized to determine a weight of the seedling tray 200 and/or flood table 300. The load cells 416 may be considered a force transducer in that force, such as tension, compression, pressure, or torque applied to the load cell 430 is detected and translated, modulated, or otherwise formed into an electrical signal that can be measured. As force applied to the load cell 416 increases, the electrical signal changes proportionally, thus enabling measurement of the force, or weight, applied to the load cell 416. In one embodiment, the load cell 416 is a tension-type load cell. Examples of tension-type load cells include, but are not limited to, pancake type load cell, a canister type load cell, and an S-type load cell, among others.

The load cell 416 may also be a hydraulic, pneumatic, piezoelectric, or strain gauge type load cell. In one embodiment, the load cell 416 includes a strain gauge. In this embodiment, the load cell 416 includes a metallic body which exhibits minimal elasticity which can be considered a spring element. As force is exerted on the metallic body, the spring element of the body is deformed. A strain gauge, which may be a wire or foil, is typically coupled to the body by a flexible backing material, either elongates, compresses, or otherwise deforms in response to deformation of the spring element. In one embodiment, the strain gauge is a wheatstone bridge or the like. The strain gauge measures changes in the force via a change in electrical resistance which can then be standardized as a weight, for example, a weight of the seedling tray 200 and/or flood table 300.

Figure 4B:
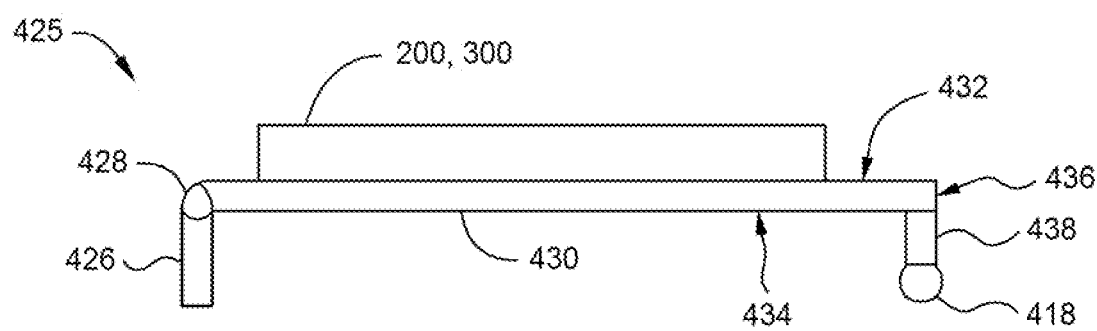
FIG. 4B illustrates a weight measurement system according to an embodiment of the disclosure.

FIG. 4B illustrates a weight measurement system 425 according to an embodiment of the disclosure. More specifically, FIG. 4B illustrates a schematic side view of the weight measurement system 425. The system 425 includes a first member 426 and a second member 430 which form a platform. The first member 426 and second member 430 function to provide a platform upon which a seedling tray 200 and/or flood table 300 are positioned for weight measurement. It is contemplated that the first member 426 and second member 430 are similar to the first member 404 and second member 406 described with regard to FIG. 4A. However, the first member 426 and second member 430 may be coupled together by a joint 428. The joint 428, such as a hinge, bearing, or the like, enables movement of the second member 430 relative to the first member 426 which is stationary. In an alternate embodiment, the joint 428 is optional such that the first member 426 and second member 430 are coupled together in a fixed orientation. In this embodiment, a structuring element, such as the structuring element 402, may be utilized to enable movement or rotation of the platform formed by the first member 426 and second member 430.

Similar to the top surface 410, a top surface 432 of the second member 430 is adapted, sized, or otherwise configured to support a seedling tray 200 and/or flood table 300 thereon. A bottom surface 434 of the second member 430 is disposed opposite the top surface 432. An end 436 of the second member 430 extends between the top surface 432 and bottom surface 434 of the second member. A load cell 438 is disposed on the structuring element 418. The structuring element 418 is disposed below the bottom surface 434 and a load cell 438 is coupled to the structuring element 418. The load cell 438 is disposed in contact with the bottom surface 434 of the second member 430 at or adjacent to the end 436 to enable weight measurement of the seedling tray 200 and/or flood table 300. General characteristics of the load cell 438 are similar to those of the load cell 416. However, in this embodiment, the load cell 438 is a compression-type load cell.

Figure 4C:
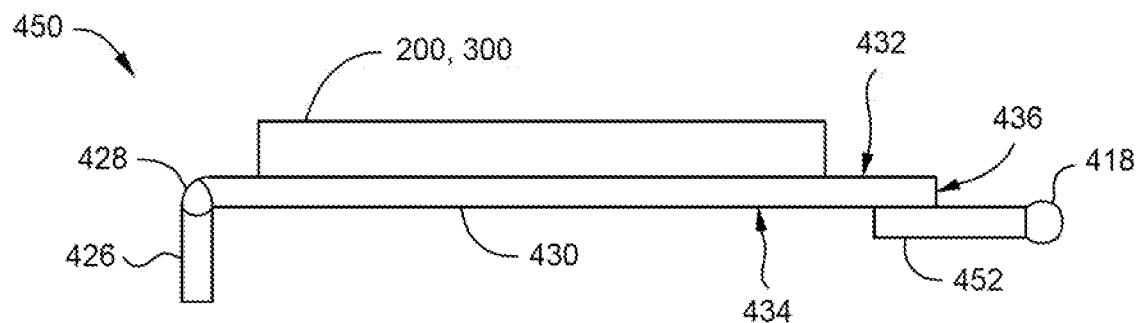
FIG. 4C illustrates a weight measurement system according to an embodiment of the disclosure.

FIG. 4C illustrates a weight measurement system 450 according to an embodiment of the disclosure. More specifically, FIG. 4C illustrates a schematic side view of the weight measurement system 450. The system 450 is similar to the system 425 but differs in the type of load cell utilized. In the illustrated embodiment, a load cell 452 is coupled to the structuring element 418 which is positioned laterally beyond the end 436. The load cell 452 extends laterally from the structuring element 418 radially inward of the end 436. The load cell 452 is disposed in contact with the bottom surface 434 of the second member 430. In one embodiment, the load cell 452 is a beam-type load cell which senses deflection of the load cell 452 to enable weight measurement of the seedling tray 200 and/or flood table 300 disposed on the second member 430.

In certain embodiments, the arrangement of the structuring element 402, first member 404, and second member 406 in FIG. 4A are utilized in the embodiments illustrated in FIGS. 4B and 4C. Alternatively, the arrangement of the joint 428, first member 426, and second member 430 in FIGS. 4B and 4C may be utilized in the embodiment of FIG. 4A. While the system 400 illustrates a tension-type load cell weight measurement system, it is contemplated that the system 400 is also adapted to utilize a compression-type load cell or beam-type load cell weight detection system. Similarly, although the system 425 illustrates a compression-type load cell weight measurement system, it is contemplated that the system 425 is also adapted to utilize a tension-type load cell or beam-type load cell weight detection system. It is further contemplated that the beam-type load cell system 450 is also adapted to utilize a tension-type load cell or a compression-type load cell weight measurement system.

In operation, the systems 400, 425, 250 utilize the load cells 416, 438, 452 to measure a weight of a seedling tray 200 and/or flood table 300. In one example, the systems 400, 425, 250 are configured to measure the weight of the flood table 300. In another embodiment, the systems 400, 425, 450 are configured to measure the weight of the seedling tray 200. In another embodiment, the systems 400, 425, 450 are configured to measure the weight of the seedling tray 200 disposed in the flood table 300. It is contemplated that the ability to use a single system 400, 425, or 450 to measure the weight of different apparatus, such as the seedling tray 200 and/or flood table 300, may increase the efficiency by which plant irrigation, growth, and development data is obtained.

Figure 5A:
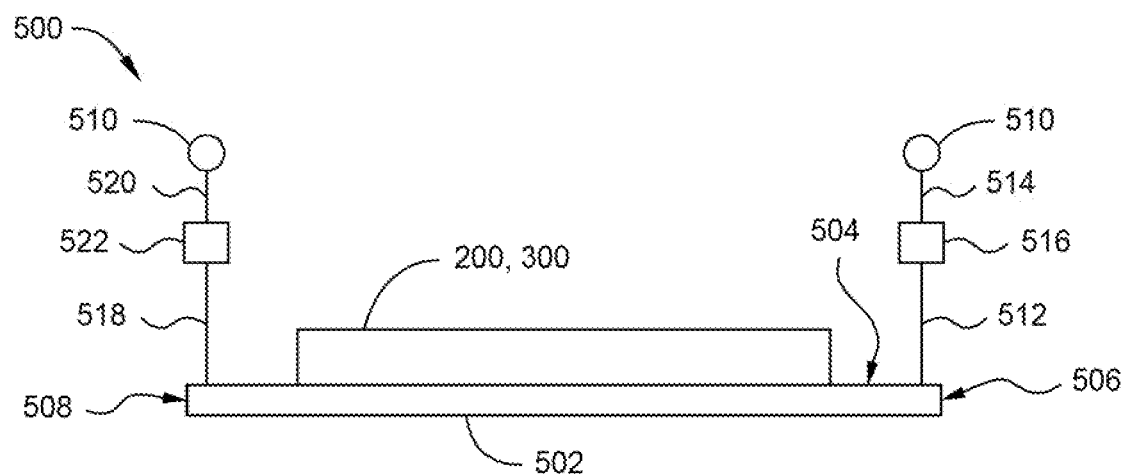
FIG. 5A illustrates a weight measurement system according to an embodiment of the disclosure.

FIG. 5A illustrates a weight measurement system 500 according to an embodiment of the disclosure. More specifically, FIG. 5A illustrates a schematic side view of the weight measurement system 500. The system 500 includes a platform 502 having a support surface 504 which is sized, adapted, or otherwise configured to support a seedling tray 200 and/or flood table 300 thereon. The platform 502 is a plate, support, stage, block, or other similar structure which is sized to support the seedling tray 200 and/or flood table 300 thereon. It is also contemplated that the platform 502 may be a plurality of rails, beams, or other similar structure sized and otherwise configured to support the seedling tray 200 and/or flood table 300 thereon. The platform 502 is fabricated from metallic, polymeric, or other materials which exhibit sufficient structural integrity to support the seedling tray 200 and/or flood table 300. In one embodiment, the platform 502 is similar to the second members 406, 430.

The support surface 504 of the platform 502 extends from a first end 506 to a second end 508. A first load cell 516 is coupled to the platform 502 at or adjacent to the first end 506 by a first connector 512. In one embodiment, the first connector is coupled to the support surface 504. The first load cell 516 is coupled to a structuring element 510, such as a frame, support, or other superstructure by a second connector 514. In one embodiment, the connectors 512, 514 are similar to the connectors 412, 414. A second load cell 522 is coupled to the platform 502 at or adjacent to the second end 508 by a third connector 518. In one embodiment, the third connector 581 is coupled to the support surface 504. The second load cell 522 is coupled to the structuring element 510 by a fourth connector 520. The connectors 518, 520 are contemplated as being similar to the connectors 512, 514. The first load cell 516 and second load cell 522 are tension-type load cells. In one embodiment, the load cells 516, 522 are similar to the load cell 416.

The connectors 512, 518 are coupled to the platform 502 radially outward of the seedling tray 200 and/or flood table 300. While two load cells 516, 522 are illustrated, it is contemplated that additional load cells and connectors may be utilized. For example, if the platform 502 is shaped as a quadrilateral, four load cells and associated connectors are utilized at corners of the platform 502. Other platform shapes may be utilized and corresponding load cell arrangements are contemplated as being within the scope of this disclosure. Similarly, additional connectors 512, 518 are coupled between the load cells 516, 522 and the platform 502, respectively. For example, a plurality of first connectors 512 extends from the first load cell 516 and couple to the platform 502 to further support and increase the stability of the platform 502 when the platform 502 is suspended of under load. A plurality of third connectors 518 also extends from the second load cell 522 and coupled to the platform 502 to improve stability of the platform 502 and reduce the probability for rotation or torqueing of the platform 502 during weight measurement of the seedling tray 200 and/or flood table 300.

Figure 5B:
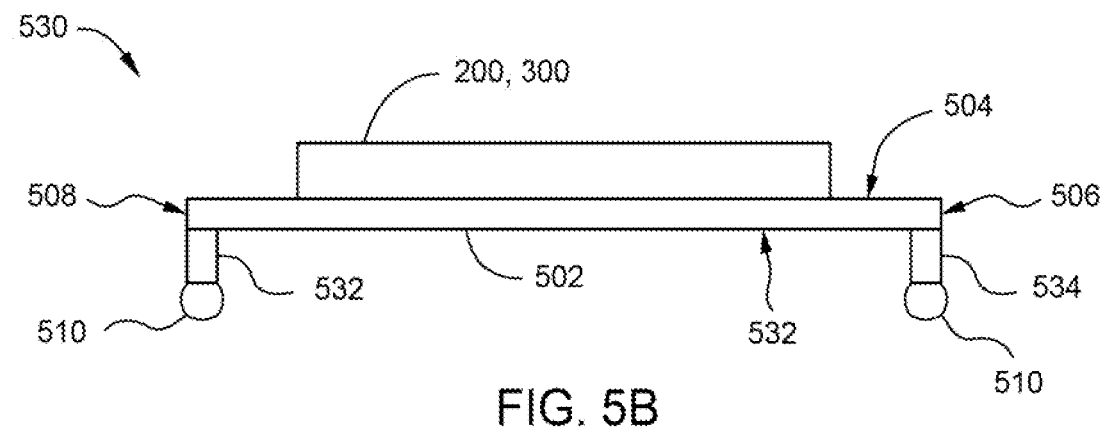
FIG. 5B illustrates a weight measurement system according to an embodiment of the disclosure.

FIG. 5B illustrates a weight measurement system 530 according to an embodiment of the disclosure. More specifically, FIG. 5B illustrates a schematic side view of the weight measurement system 530. The platform 502 includes a bottom surface 532 disposed opposite the support surface 504. A plurality of load cells 532, 534 are coupled between the bottom surface 532 of the platform 502 and the structuring element 510. In the illustrated embodiment, the structuring element 510 is positioned below the platform 502 or on a side of the platform 502 opposite the support surface 504.

A first load cell 532 is coupled to the bottom surface 532 of the platform 502 adjacent to the second end 508 of the platform 502. A second load cell 534 is coupled to the bottom surface 532 of the platform 502 adjacent to the first end 506 of the platform 502. The first load cell 532 and second load cell 534 are compression-type load cells. In one embodiment, the load cells 532, 532 are similar to the load cell 438.

While two load cells 532, 534 are illustrated, it is contemplated that additional load cells may be utilized. For example, if the platform 502 is shaped as a quadrilateral, four load cells (and associated structuring elements 510) may be positioned at each corner of the platform 502. Other platform shapes may be utilized and corresponding load cell arrangements are contemplated as being within the scope of this disclosure. Utilizing a plurality of load cells is believed to further support and increase the stability while reducing torqueing of the platform 502 when the platform 502 is under load. In addition, utilizing multiple load cells is believed to increase the weight detection resolution to more accurately detect weight related characteristics of the seedling tray 200 and/or flood table 300.

Figure 5C:
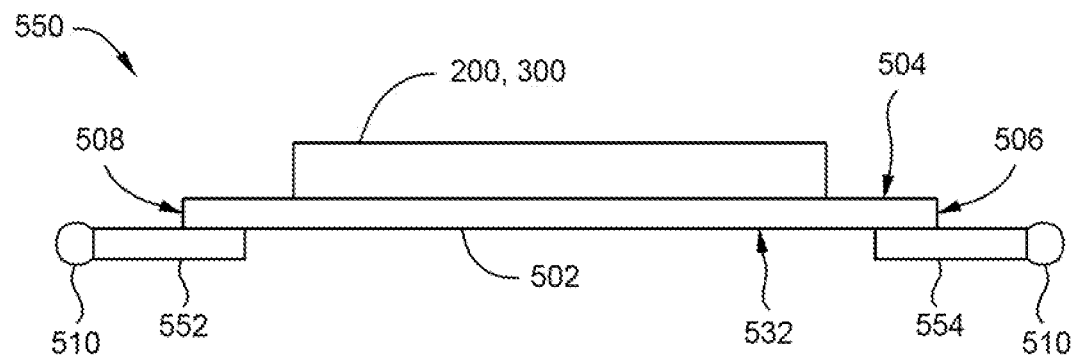
FIG. 5C illustrates a weight measurement system according to an embodiment of the disclosure.

FIG. 5C illustrates a weight measurement system 550 according to an embodiment of the disclosure. More specifically, FIG. 5C illustrates a schematic side view of the weight measurement system 500. In the illustrated embodiment, the platform 502 is supported by opposing load cells 552, 554. A first load cell 552 is coupled between the structuring element 510 and the bottom surface 532 of the platform 502. The first load cell 552 extends from the structuring element 510, which is disposed radially outward of the second end 508, radially inward of the second end 508. Similarly, a second load cell 554 is coupled between the structuring element 510 and the bottom surface 532 of the platform 502. The second load cell 554 extends form the structuring element 510, which is disposed radially outward of the first end 506, radially inward of the first end 506.

The first load cell 552 and second load cell 554 are beam-type load cells. In one embodiment, the load cells 552, 554 are similar to the load cell 452. While two load cells 552, 554 are illustrated, it is contemplated that additional load cells may be utilized. For example, if the platform 502 is shaped as a quadrilateral, four load cells (and associated structuring elements 510) may be positioned at each corner of the platform 502. Utilizing a plurality of load cells is believed to further support and increase the stability while reducing torqueing of the platform 502 when the platform 502 is under load. In addition, utilizing multiple load cells is believed to increase the weight detection resolution to more accurately detect weight related characteristics of the seedling tray 200 and/or flood table 300.

Figure 6A:
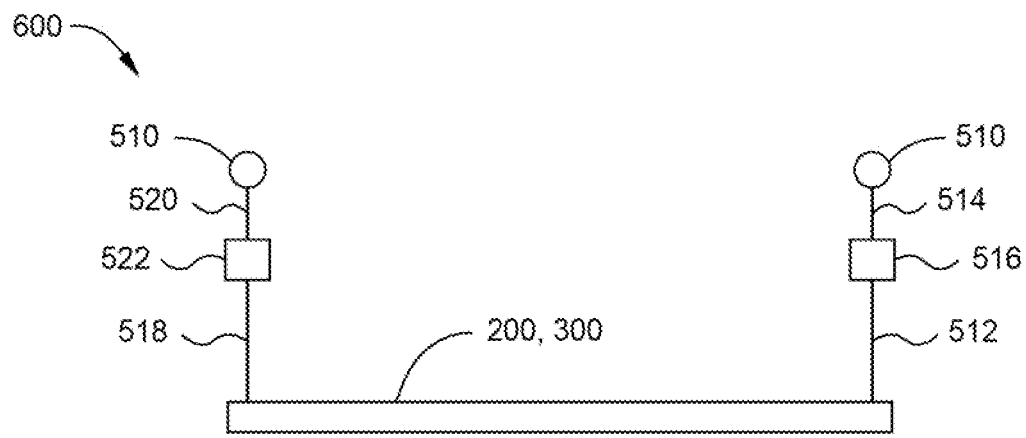
FIG. 6A illustrates a weight measurement system according to an embodiment of the disclosure.

FIG. 6A illustrates a weight measurement system 600 according to an embodiment of the disclosure. More specifically, FIG. 6A illustrates a schematic side view of the weight measurement system 600. The system 600 is similar to the system 500, however, the system 600 does not utilize the platform 502. Rather, the system 600 is coupled directly to the seedling tray 200 and/or flood table 300. In one example, the first connector 512 and third connector 518 are coupled to the seedling tray 200 and/or flood table 300 by a coupling assembly 602. The coupling assembly 602 is connected to both of the connectors 512, 518 and the seedling tray 200 and/or flood table 300.

In one embodiment, a first portion 604 of the coupling assembly 602 is disposed on the connectors 512, 518 and a second portion 606 of the coupling assembly 602 is disposed on the seedling tray 200 and/or flood table 300. For example, the first portion 604 may be a threaded male connector and the second portion 606 may be a threaded female connector. In this example, the threaded connectors of the first portion 604 and the second portion 606 are rotated into engagement to secure the seedling tray 200 and/or flood table 300 to the system 600.

In other embodiments, the coupling assembly 602 is a ball and sleeve coupling, a cam-lock coupling, a push-to-connect coupling, or other suitable mechanical coupling. In certain embodiments, the coupling assembly 602 is a quick-connect type coupling to enable efficient engagement of the seedling tray 200 and/or flood table 300 with the system 600. Other types of coupling assemblies, such as magnetic assemblies or the like, may be implemented according to the embodiments described herein. By enabling efficient coupling between the seedling tray 200 and/or flood table 300 and the system 600, multiple seedling tray 200 and/or flood table 300 weights may be measured accurately and efficiently.

Figure 6B:
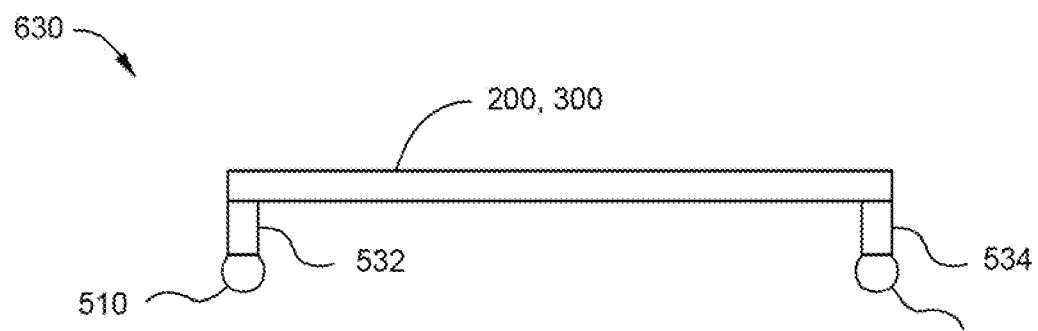
FIG. 6B illustrates a weight measurement system according to an embodiment of the disclosure.

FIG. 6B illustrates a weight measurement system 630 according to an embodiment of the disclosure. More specifically, FIG. 6B illustrates a schematic side view of the weight measurement system 630. In one embodiment, the seedling tray 200 and/or flood table 300 is positioned on the load cells 532, 534 and held in place by gravity. In other embodiments, coupling assemblies, such as those described with regard to FIG. 6A, are implemented at the interface of the load cells 532, 534 and the seedling tray 200 and/or flood table 300.

Figure 6C:
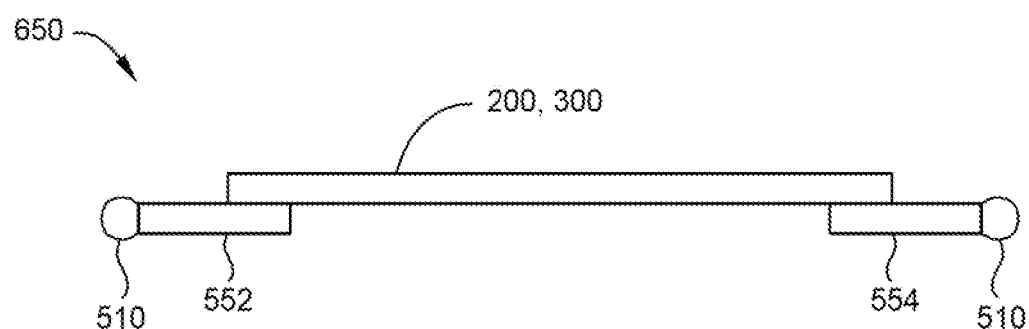
FIG. 6C illustrates a weight measurement system according to an embodiment of the disclosure.

FIG. 6C illustrates a weight measurement system 650 according to an embodiment of the disclosure. More specifically, FIG. 6C illustrates a schematic side view of the weight measurement system 650. In one embodiment, the seedling tray 200 and/or flood table 300 is positioned on the load cells 552, 554 and held in place by gravity. In other embodiments, coupling assemblies, such as those described with regard to FIG. 6A, are implemented at the interface of the load cells 552, 554 and the seedling tray 200 and/or flood table 300.

The systems 500, 530, 550, 600, 630, 650 generally illustrate apparatus for stationary weight measurement of seedling trays 200 and/or flood tables 300. In other words, the seedling trays 200 and/or flood tables 300 are not being actively conveyed during the utilization of the systems 500, 530, 550, 600, 630, 650. However, it is contemplated that the systems 500, 530, 550, 600, 630, 650 may be adapted for weight measurement of the seedling trays 200 and/or flood tables 300 while the seedling trays 200 and/or flood tables 300 are being conveyed or otherwise moved during weight measurement. It is further contemplated that the coupling assembly 602 described with regard to FIG. 6A may be implemented with the system 500 illustrated in FIG. 5A and various permutations of the coupling assembly 602 find advantageous implementation with the systems 530, 550 described with regard to FIGS. 5B and 5C, respectively.

Figure 7A:
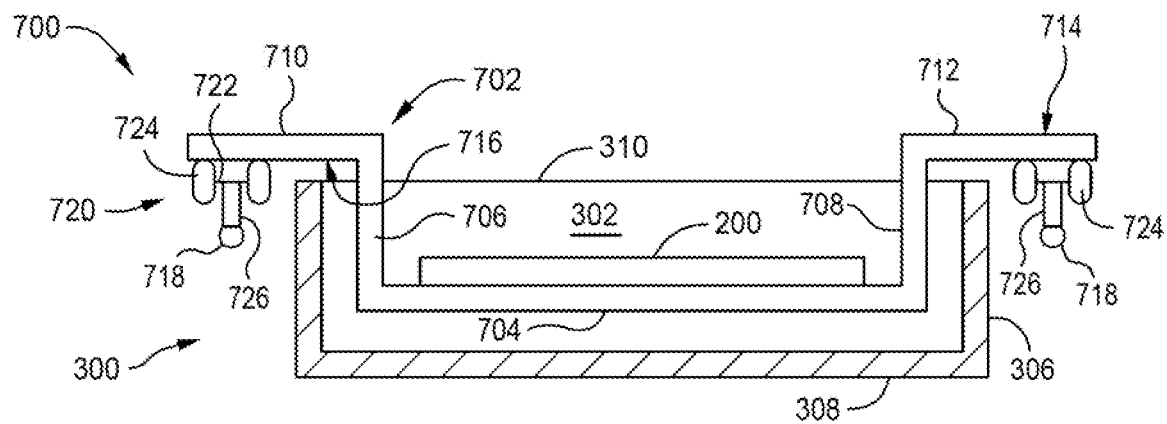
FIG. 7A illustrates a weight measurement system according to an embodiment of the disclosure.

FIG. 7A illustrates a weight measurement system 700 according to an embodiment of the disclosure. More specifically, FIG. 7A illustrates a schematic side view of the weight measurement system 700. The system 700 includes a carrier 702 and a carriage assembly 720 which are adapted to convey the seedling tray 200 through the flood table 300. It is also contemplated that the system 700 may be used to convey the seedling tray 200 apart from the flood table 300.

The carrier 702 includes a support plate 704 and a plurality of arms 706, 708 extending from the support plate 704. The support plate 704 is sized to support the seedling tray 200 thereon and is fabricated in any suitable shape. In one embodiment, a width of the support plate 704 is less than a width of the base 308 of the flood table 300. For example, the support plate 704 may be square shaped, rectangular shaped, or another shape which is adapted to support the seedling tray 200 thereon and be conveyed within the system 700. The carrier 702 is fabricated from a metallic or polymeric material which exhibits sufficient mechanical integrity to support the seedling tray 200 thereon during conveyance. The material may also be inert and non-reactive upon exposure to a nutrient fluid which may exist within the volume 302 of the flood table 300.

A first arm 706 is disposed opposite from a second arm 708. The arms 706, 708 extend in a direction substantially perpendicular to a major axis of the support plate 704. It is contemplated that the arms 706, 708 also extend from the support plate 704 in non-perpendicular orientations, depending upon the desired implementation. In one embodiment, a magnitude of the arms 706, 708 extension is greater than or equal to a depth of the flood table 300 defined by a magnitude of the sidewalls 306. In another embodiment, the magnitude of the arms 706, 708 is less than a magnitude of the sidewall 306 extension. In this embodiment, a magnitude of the arms 706, 708 is sufficient to ensure the support plate 704 and seedling tray 200 disposed thereon is disposed below the end 310 of the sidewalls 306 such that the support plate 704 and seedling tray 200 are disposed within the volume 302 of the flood table 300.

A plurality of flanges 710, 712 are coupled to and extend from the arms 706, 708, respectively. A first flange 710 extends laterally outward from the first arm 706 and a second flange 712 extends laterally outward from the second arm 708. In one embodiment, the flanges 710, 712 extend in a direction substantially perpendicular from a major axis of the arms 706, 708. The flanges 710, 712 include a first surface 714 and a second surface 716. The surfaces 714, 716 are disposed opposite and parallel to one another. In one embodiment, the second surface 716 extends over the end 310 of the sidewalls 306 and faces the end 310. In another embodiment, the flanges 710, 712 are substantially parallel to the support plate 704. The flanges 710, 712 are also disposed in a different horizontal plane from the support plate 704.

A plurality of carriage assemblies 720 are disposed adjacent to the flood table 300. The carriage assemblies 720 are disposed laterally outward of the sidewalls 306 such that the carriage assemblies 720 are not disposed within the volume 302 of the flood table 300. A conveyor superstructure 718 is also disposed laterally outward of the flood table 300. The superstructure 718 is part of the system 700 or another structure adapted to interface with the carriage assemblies 720 and enable passable of the flood table 300 therebetween. For example, the superstructure 718 may be a frame, support, or other similar structure.

In the embodiment of FIG. 7A, the carriage assemblies 720 include an axle 722, wheels 724, and a load cell 726. The wheels 724 are coupled to the axle 722 and rotate about the axle 722. The load cell 726 is coupled to the axle 722 between the wheels 724. While two wheels 724 are illustrated, it is contemplated that the carriage assemblies 720 utilize a single wheel. Alternatively, the carriage assemblies 720 may utilize three or more wheels depending upon the desired implementation.

The load cell 726 is coupled to the superstructure 718. Thus, the carriage assemblies 720 are oriented such that the wheels 724 and axle 722 are positioned above the load cell 726. In one embodiment, the load cell 726 is fixably coupled to the superstructure 718 such that the carriage assemblies 720 remain stationary relative to the carrier 702 that is conveyed along the carriage assemblies 720. In this embodiment, the wheels 724 are positioned in contact with the second surface 716 of the flanges 710, 712. Thus, the flanges 710, 712 ride along the wheels 724 of the carriage assemblies 720 as the carrier 702 is conveyed through or relative to the flood table 300.

The load cell 726 is a compression-type load cell. Examples of suitable load cells are described with regard to FIG. 4A. The load cell 726 is adapted to detect a weight of the carrier 702 and seedling tray 200 when the carrier 702 is supported by the carriage assemblies 720. In operation, the weight of the carrier 702 and seedling tray 200 exert force on the load cell 726 of the carriage assembly 720 and the load cell 726 can utilize the force applied thereon to determine a weight of the carrier 702 and/or seedling tray 200. In one example, the combined weight of the carrier 702 and seedling tray 200 is detected by the load cell 726 and the weight of the carrier 702 (a known weight) can be subtracted to resolve the weight of the seedling tray 200.

By enabling weight measurement of the seedling tray 200 during conveyance, relative seedling growth and/or soil saturation data may be determined in an efficient manner. For example, by incorporating weight measurement capability during conveyance of the seedling tray 200, various data may be gathered as the seedling tray 200 traverses the conveyors 104, 110, 114 of the system 100. While two carriage assemblies 720 are illustrated, additional carriage assemblies may be disposed along a length of a conveyor and/or flood table to facilitate movement of the carrier 702 over the carriage assemblies 720. It is also contemplated that the germination station 108 and propagation station 112 may also benefit from the implementation of the conveyed weight measurements systems described herein.

Figure 7B:
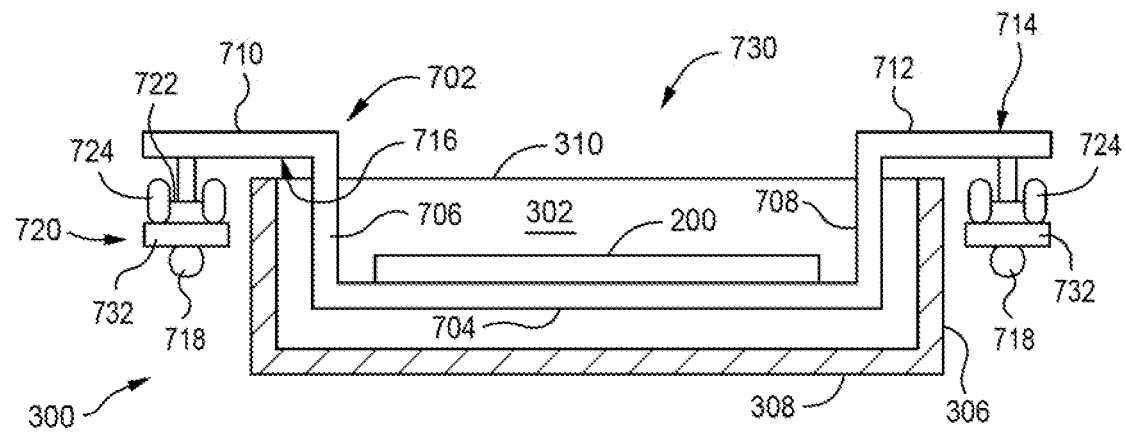
FIG. 7B illustrates a weight measurement system according to an embodiment of the disclosure.

FIG. 7B illustrates a weight measurement system 730 according to an embodiment of the disclosure. More specifically, FIG. 7B illustrates a schematic side view of the weight measurement system 730. In the illustrated embodiment, the carriage assemblies 720 include the wheels 724 and axle 722, however, the load cell 726 of the embodiment illustrated in FIG. 7A is replaced with a brace 734 which is coupled between the axle 722 and the second surface 716 of the flanges 710, 712. The brace 734 is a rod, bar, post, strut, or other structural member which is coupled to the second surface 716. In this embodiment, the wheels 724 of the carriage assembly 720 are not in contact with the flanges 710, 712. Rather, the wheels 724 are disposed in contact with a load cell 732 which is coupled to the superstructure 718.

In one embodiment, the load cell 732 is a compression-type load cell. The load cell 732 has a substantially planar body sized to accommodate traversal of the wheels along the load cell 732. The load cell 732 is fixably coupled to the superstructure 718 and remains stationary relative to the carriage assembly 720 conveying the carrier 720. Accordingly, a weight of the carrier 702 and/or seedling tray 200 may be detected along an entire length of the load cell 732 or at discrete points along the load cell 732, depending upon the desired implementation. Similar to the system 700, the system 730 is advantageously implemented in various components or stations of the system 100.

Figure 7C:
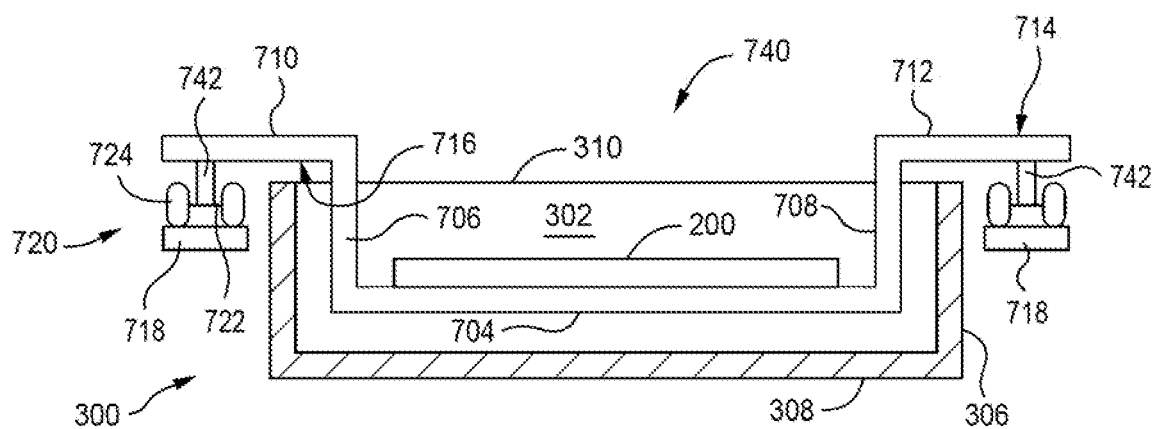
FIG. 7C illustrates a weight measurement system according to an embodiment of the disclosure.

FIG. 7C illustrates a weight measurement system 740 according to an embodiment of the disclosure. More specifically, FIG. 7C illustrates a schematic side view of the weight measurement system 740. In the illustrated embodiment, the carriage assemblies 720 are similar to the carriage assemblies 720 described with regard to FIG. 7A in that the carriage assemblies 720 include wheels 724 coupled to the axle 722 and a load cell 742 coupled to the axle 722 between the wheels 724. However, in the embodiment illustrated in FIG. 7C, the load cell 742 is positioned between the axle 722 and the second surface 716. The load cell 742 is also fixably coupled to the second surface 716. As such, the carriage assembly 720 is affixed to the carrier 702 and moves with the carrier 702 during conveyance. In one embodiment, the load cell 742 is a compression-type load cell such as those described herein.

The superstructure 718, which supports the wheels 724 of the carriage assembly 720 during conveyance, exhibits a planar surface morphology adapted to enable rolling of the wheels 724 along the superstructure 718. For example, the superstructure 718 is a rail, bar, channel, or other structure with a width sufficient to support the carriage assembly 720. As the carrier 702 and carriage assembly 720 are conveyed along the superstructure 718, a weight of the carrier 702 and/or seedling tray 200 are measured by the load cell 742. The load cell 742 is adapted to determine weight measurements continuously or at discrete positions along a length of the superstructure 718. Similar to the systems 700, 730, the system 740 is advantageously implemented in various components or stations of the system 100.

Figure 7D:
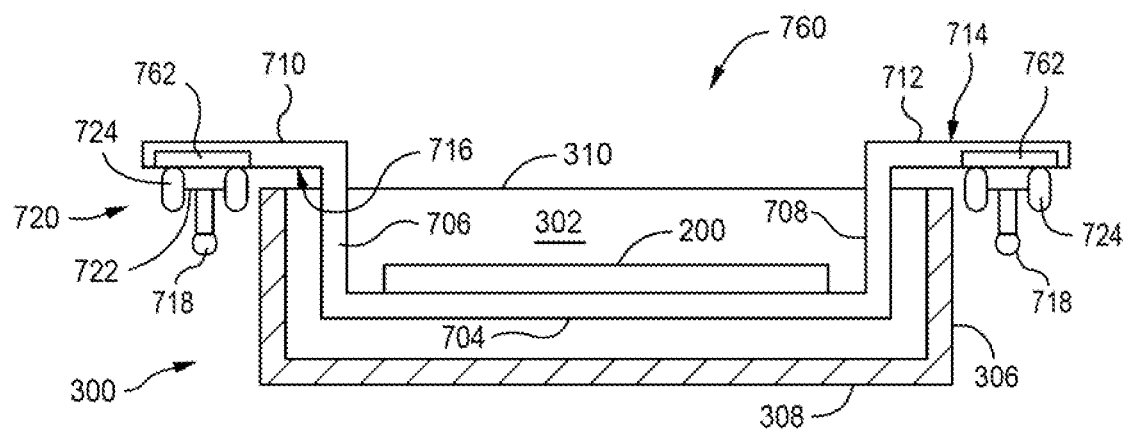
FIG. 7D illustrates a weight measurement system according to an embodiment of the disclosure.

FIG. 7D illustrates a weight measurement system 760 according to an embodiment of the disclosure. More specifically, FIG. 7D illustrates a schematic side view of the weight measurement system 760. In the illustrated embodiment, the carriage assemblies 720 include the wheels 724 and axle 722, however, the load cell 726 of the embodiment illustrated in FIG. 7A is replaced with the brace 734 which is coupled between the axle 722 and the superstructure 718. The brace 734 is a rod, bar, post, strut, or other structural member which is fixably coupled to the superstructure. In this embodiment, the wheels 724 of the carriage assembly 720 are disposed above the brace 734 and configured to support the flanges 710, 712 of the carrier 702.

In the system 760, a load cell 762 is coupled to the carrier 702 instead of being integrated into the carriage assembly 720. In the illustrated embodiment, the load cell 762 is disposed in each of the flanges 710, 712 such that the load cell 762 is recessed within the flanges 710, 712 and the load cell 762 is substantially co-planar with the second surface 716. Alternatively, the load cell 762 may be disposed on the second surface 716. The load cell 762 occupies substantially the entire second surface 716 or a portion thereof laterally outward of the sidewalls 306 of the flood table 300. The load cell 762 is a compression-type load cell which detects the weight of the carrier 702 and or seedling tray 200 as the carrier 702 is conveyed over the carriage assemblies 720. While two carriage assemblies 720 are illustrated, it is contemplated that any number of carriage assemblies 720 may be implemented along a length of the superstructure 718 to support conveyance of the carrier 702. Similar to the systems 700, 730, 740, the load cell 762 of the system 760 is configured to continuously or discretely detect a weight of the carrier 702 and/or seedling tray 200 as the carrier 702 is conveyed along the superstructure 718.

Figure 8:
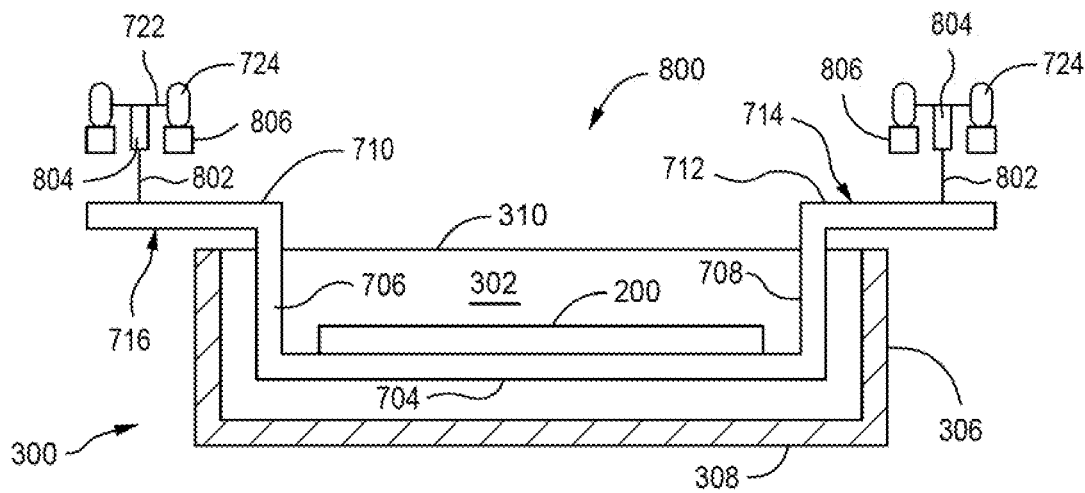
FIG. 8 illustrates a weight measurement system according to an embodiment of the disclosure.

FIG. 8 illustrates a weight measurement system 800 according to an embodiment of the disclosure. More specifically, FIG. 8 illustrates a schematic side view of the weight measurement system 800. The system 800 includes the carrier 702 and the carriage assembly 720. The carriage assembly 720 includes the wheels 724 coupled to the axle 722 and a load cell 804 coupled to the axle 722 between the wheels 724. In the illustrated embodiment, the load cell 804 is a tension-type load cell. A connector 802 is coupled between the load cell 804 and the first surface 714 of the flanges 710, 712. The connector 802 is any suitable connecting apparatus, such as a wire, rope, rod, cable, or the like.

The connector 802 is lengthened or shortened to position the support plate 704, and thus the seedling tray 200, at a desired position within the volume 302 of the flood table 300. For example, when a nutrient fluid is present within the volume 302, the connectors 802 are lengthened to at least partially submerge the seedling tray 200 in the nutrient fluid for irrigation. After a desired irrigation operation, the connectors 802 are shortened to elevate the carrier 702 and seedling tray 200 within the volume 302 above the nutrient fluid. A winch, pulley, spool, ratchet, or other similar apparatus is utilized to change the length of the connector 802.

When the carrier 702 is coupled to the carriage assembly 720, the carrier 702 is disposed below a superstructure 806. The superstructure 806 is disposed above the first surface 714 of the flanges 710, 712 such that the carriage assembly 720 is supported upon the superstructure 806 and the carrier 702 is suspended below the superstructure 806 and the carriage assembly 720. In one embodiment, the superstructure 806 included a plurality of rails, bars, rods, or tracks upon which the wheels 724 are conveyed. It is contemplated that the superstructure 806 may be fabricated from a metallic or polymeric material which exhibits sufficient structural integrity to support the carrier 702 and seedling tray 200 thereon. In one example, the superstructure 806 includes two rails positioned above the first flange 710 and two rails positioned above the second flange 712. The load cell 804 is positioned between the axle 722 and the first surface 714 and extends between the adjacent rails of the superstructure 806 above each flange 710, 712.

In one embodiment, the position of the superstructure 806 relative to the flood table 300 remains substantially constant over a distance that the carrier 702 is conveyed. In another embodiment, the position of the superstructure 806 relative to the flood table 300 changes over the distance that the carrier 702 is conveyed. For example, when the superstructure 806 is positioned a first distance from the flood table 300, the support plate 704 is elevated above a nutrient fluid contained within the volume 302 of the flood table 300. The first distance is changed to a second distance where the superstructure 806 is positioned closed to the flood table 300. The second distance position of the superstructure 806 positions the support plate 704 and seedling tray 200 in at least a partially submerged position within the volume 302. In this example, the length of the connector 802 remains substantially constant. Accordingly, as the carrier 702 is conveyed along a length of the superstructure 806, the carrier is raised and lowered within the volume 302 of the flood table 300.

In operation, the carrier 720 is supported by the carriage assembly 720 which rides along the superstructure 806. The weight of the carrier 702 and seedling tray 200 are detected by the load cell 804 during conveyance of the carrier 702 along the superstructure 806. Weight detected by the load cell 804 is continuous or discrete over a conveyance distance along the superstructure 806. The tension-type load cell 804 with the superstructure 806 positioned above the flood table 300 and carrier 702 is utilized in the conveyors 104, 110, 114 and may also find advantageous implementation within the germination station 108 and propagation station 112 of the system 100.

Figure 9A:
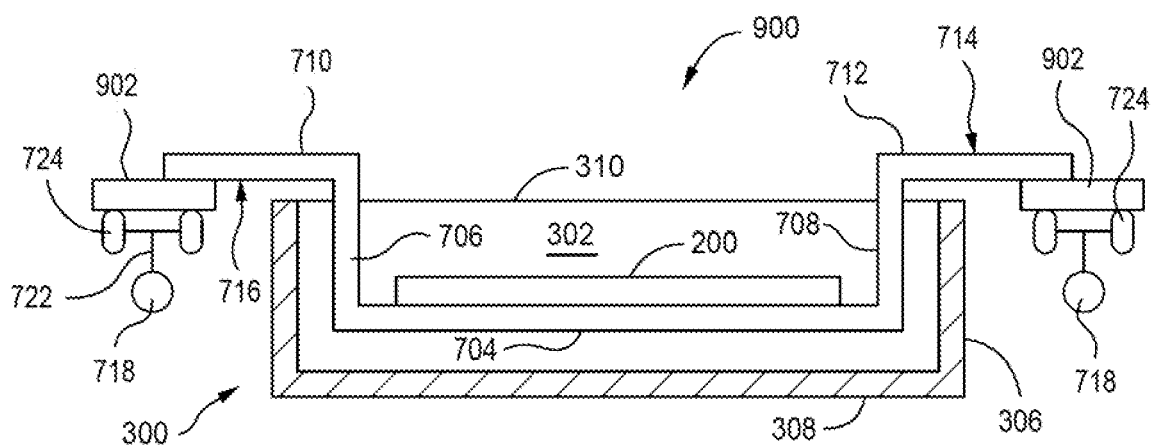
FIG. 9A illustrates a weight measurement system according to an embodiment of the disclosure.

FIG. 9A illustrates a weight measurement system 900 according to an embodiment of the disclosure. More specifically, FIG. 9A illustrates a schematic side view of the weight measurement system 900. The carriage assembly 720 is coupled to the superstructure 718 and both of the carriage assembly 720 and superstructure 718 are positioned below a second surface 716 of the flanges 710, 712. The carriage assembly 720 includes the brace 734 which is fixably coupled to the superstructure 718 such that the carriage assembly 720 is stationary. The wheels 724 are positioned above the superstructure 718 and configured to support a load cell 902 which is coupled to the carrier 702.

The load cell 902 is coupled to the second surface 716 of the flanges 710, 712 laterally outward of the sidewalls 306 of the flood table 300. In one embodiment, the load cell 902 is bolted, screwed, adhered, or otherwise affixed to the flanges 710, 712 such that the load cell 902 moves with the carrier 702 when the carrier 702 is conveyed. At least a portion of the load cell 902 extends laterally outward beyond an end 904 of the flanges 710, 712. In one embodiment, the load cell 902 is a beam-type load cell.

In operation, the load cell 902 rides along the wheels 724 of the carriage assembly 720 when the carrier 702 is conveyed. In one embodiment, the wheels 724 of the carriage assembly 720 are positioned below the portion of the load cell 902 which extends beyond the end 904 and the portion of the load cell 902 coupled to the flanges 710, 712. In another embodiment, both wheels 724 of the carriage assembly are positioned below the portion of the load cell 902 which extends beyond the end 904. The beam-type load cell 902 detects force applied thereon and the load cell 902 may be configured to continuously or discretely detect a weight of the carrier 702 and seedling tray 200 as the carrier 702 is conveyed along the superstructure 718.

While two carriage assemblies 720 are illustrated, it is contemplated that any number of carriage assemblies 720 may be implemented along a length of the superstructure 718 to support conveyance of the carrier 702. It is contemplated that the system 900 may be utilized in the conveyors 104, 110, 114 and may also find advantageous implementation within the germination station 108 and propagation station 112 of the system 100.

Figure 9B:
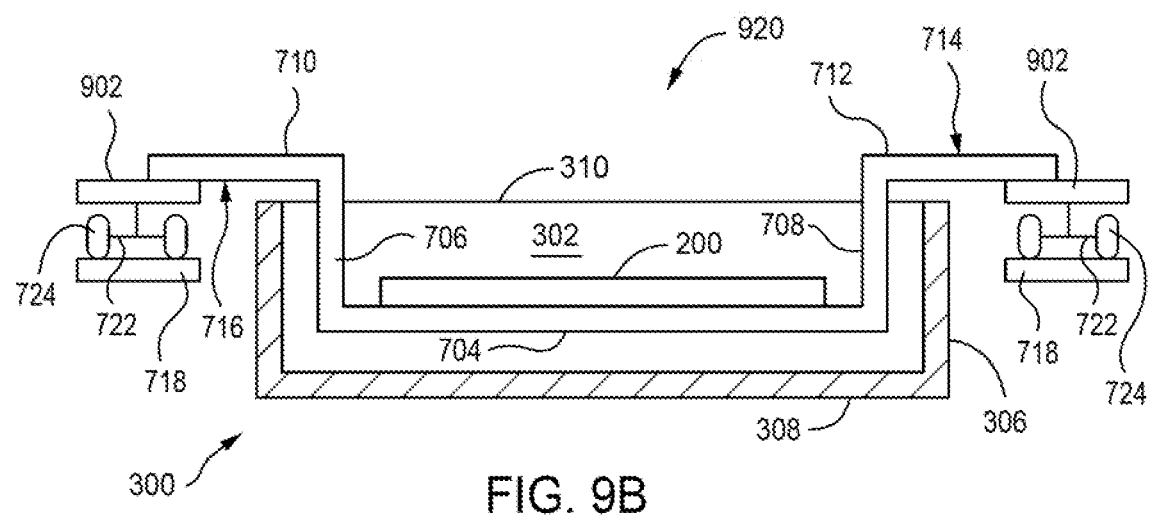
FIG. 9B illustrates a weight measurement system according to an embodiment of the disclosure.

FIG. 9B illustrates a weight measurement system 920 according to an embodiment of the disclosure. More specifically, FIG. 9B illustrates a schematic side view of the weight measurement system 920. The load cell 902 is coupled to the second surface 716 of the flanges 710, 712 laterally outward of the sidewalls 306 of the flood table 300. In one embodiment, the load cell 902 is bolted, screwed, adhered, or otherwise affixed to the flanges 710, 712 such that the load cell 902 moves with the carrier 702 when the carrier 702 is conveyed. At least a portion of the load cell 902 extends laterally outward beyond an end 904 of the flanges 710, 712. In one embodiment, the load cell 902 is a beam-type load cell.

The carriage assembly 720 is coupled to the load cell 902 and both of the carriage assembly 720 and superstructure 718 are positioned below a second surface 716 of the flanges 710, 712. The carriage assembly 720 includes the brace 734 which is fixably coupled to the load cell 902 such that the carriage assembly 720 moves with the carrier 702 when the carrier 702 is conveyed. The wheels 724 are positioned above the superstructure 718 and ride along the superstructure 718 during conveyance. The superstructure 718 is configured as a plate, rail, track, or other structure which is configured to support the wheels 724 of the carriage assembly 720. In one embodiment, the brace 734 of the carriage assembly 720 is coupled to the load cell 902 laterally outward of the end 904.

Similar to the system 900, the beam-type load cell 902 of the system 920 detects force applied thereon and the load cell 902 may be configured to continuously or discretely detect a weight of the carrier 702 and seedling tray 200 as the carrier 702 is conveyed along the superstructure 718. It is contemplated that the system 920 may be utilized in the conveyors 104, 110, 114 and may also find advantageous implementation within the germination station 108 and propagation station 112 of the system 100.

Figure 9C:
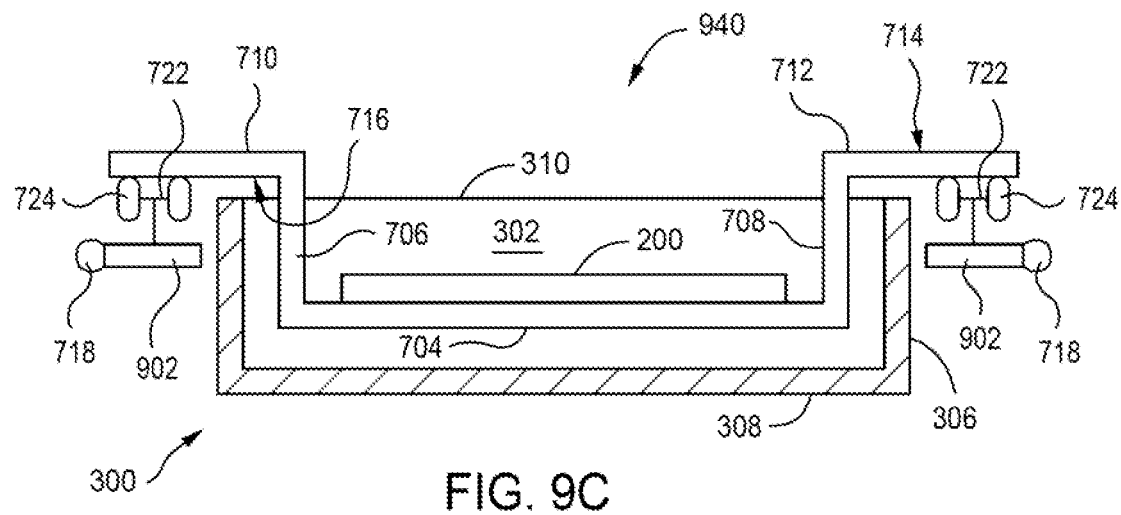
FIG. 9C illustrates a weight measurement system according to an embodiment of the disclosure.

FIG. 9C illustrates a weight measurement system 940 according to an embodiment of the disclosure. More specifically, FIG. 9A illustrates a schematic side view of the weight measurement system 940. The system 940 includes the carrier 720, the load cell 902 coupled to the superstructure 718, and the carriage assemblies 720 disposed between the load cells 902 and the flanges 710, 712 of the carrier 702. The superstructure 718 is positioned laterally outward of the sidewalls 306 of the flood table and the load cell 902 is coupled to the superstructure 718. The superstructure 718 may also be positioned laterally outward of the end 904 of the flanges 710, 712. In one embodiment, the superstructure 718 is positioned between the load cell 902 and the sidewalls 306 of the flood table 300. Alternatively, the load cell 902 may be coupled directly to the sidewalls 306 of the flood table 300 and extend laterally outward in a manner substantially parallel to the second surface 716 of the flanges 710, 712. In the illustrated embodiment, the superstructure 718 is positioned laterally outward of the load cell 902 and the load cell 902 extend from the superstructure 718 toward the sidewalls 306 of the flood table 300. In one embodiment, the load cell 902 is a beam-type load cell.

The brace 734 of the carriage assemblies 720 is fixably coupled to the load cell 902 and the axle 722 and wheels 724 of the carriage assemblies 720 are positioned above the load cell 902. Thus, the carriage assemblies 720 are stationary and the second surface 716 of the flanges 710, 712 ride along the wheels 724 of the carriage assemblies 720 during conveyance. While two carriage assemblies 720 are illustrated, it is contemplated that any number of carriage assemblies 720 may be implemented along a length of the superstructure 718 to support conveyance of the carrier 702. The beam-type load cell 902 of the system 940 detects force applied thereon and the load cell 902 are configured to continuously or discretely detect a weight of the carrier 702 and seedling tray 200 as the carrier 702 is conveyed along the superstructure 718. It is contemplated that the system 940 may be utilized in the conveyors 104, 110, 114 and may also find advantageous implementation within the germination station 108 and propagation station 112 of the system 100.

Figure 9D:
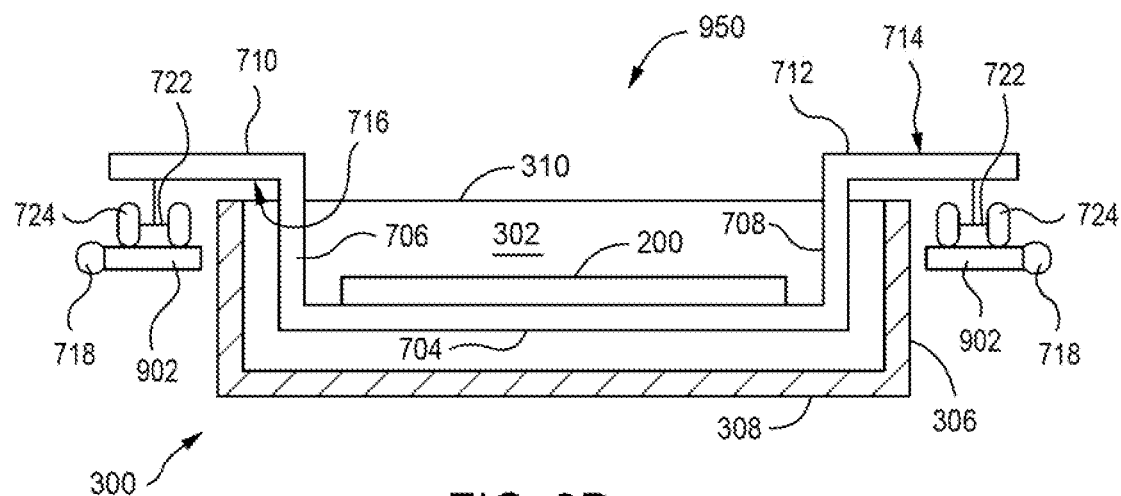
FIG. 9D illustrates a weight measurement system according to an embodiment of the disclosure.

FIG. 9D illustrates a weight measurement system 950 according to an embodiment of the disclosure. More specifically, FIG. 9D illustrates a schematic side view of the weight measurement system 950. The superstructure 718 and load cell 902 arrangement of FIG. 9D is similar to the embodiments described with regard to FIG. 9C. The load cell 902 and/or the superstructure 718 are formed as an elongated plate, rod, rail, track, or other structure which is adapted to support conveyance of the carrier 702 by the carriage assemblies 720. As previously described, the load cell 902 is a beam-type load cell.

The brace 734 of the carriage assembly 720 is coupled to the second surface 716 of the flanges 710, 712 such that the axle 722 and wheels 724 are positioned below the second surface 716. In one embodiment, the brace 734 is fixably coupled to the second surface 716 such that the carriage assemblies 720 move with the carrier 720 during conveyance. The beam-type load cell 902 of the system 950 detects force applied thereon and the load cell 902 is configured to continuously or discretely detect a weight of the carrier 702 and seedling tray 200 as the carrier 702 is conveyed along the superstructure 718. It is contemplated that the system 950 may be utilized in the conveyors 104, 110, 114 and may also find advantageous implementation within the germination station 108 and propagation station 112 of the system 100.

Figure 10A:
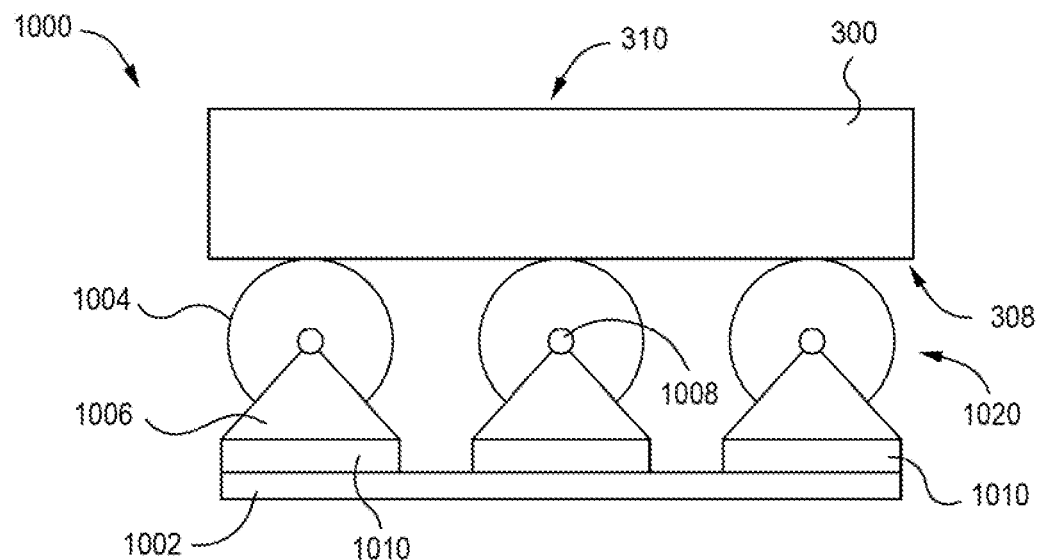
FIG. 10A illustrates a weight measurement system according to an embodiment of the disclosure.

FIG. 10A illustrates a weight measurement system 1000 according to an embodiment of the disclosure. More specifically, FIG. 10A illustrates a schematic side view of the weight measurement system 1000. The system 1000 includes a conveyor platform 1002, a plurality of rollers 1020, and a plurality of load cells 1010. The conveyor platform 1002 is a frame or other superstructure upon which the rollers 1020 and load cells 1010 are positioned. The platform 1002 is fabricated from a metallic or polymeric material having sufficient structural integrity to support conveyance of a flood table 300 and/or seedling tray 200 thereon.

The rollers 1020 include a yoke 1006, an axle 1008 coupled to the yoke 1006, and a wheel 1004 coupled to the axle 1008. In one embodiment, the axle 1008 extends through the wheel 1004 and is supported on at least two sides of the wheel 1004 by the yoke 1006. The yoke 1006 and axle 1008 enable the wheels 1004 to rotate about an axis defined by the axle 1008. The yoke 1006 is a metallic or polymeric material selected to exhibit sufficient mechanical integrity to support the flood table 300 and/or seedling tray 200 being conveyed along the rollers 1020. Similarly, the axle 1008 is fabricated from a metallic or polymeric material. The wheels 1004 are fabricated from a metallic or polymeric material. The wheels 1004 are fabricated from an elastomeric material, such as rubber or the like. Examples of suitable metallic materials include steel materials, aluminum material, and alloys and combinations thereon. Examples of suitable polymeric materials include polyvinyl chloride materials, polyethylene materials, polypropylene materials, polybutylene materials, polystyrene materials, polycarbonate materials, acrylic materials, composite materials, and other similar materials.

The load cells 1010 are disposed between the platform 1002 and the rollers 1020. In one example, a load cell 1010 is coupled to each yoke 1006 and the load cell 1010 is disposed between the yoke 1006 and the platform 1002. In one embodiment, the load cell 1010 is fixably coupled to the yoke 1006. In another embodiment, the load cell 1010 is fixably coupled to the platform 1002. In certain embodiments, the load cell 1010 is integrated within the platform 1002 and the yoke 1006 is coupled to the platform 1002 on the load cell 1010. The load cells 1010 are compression-type load cells.

In operation, the flood table 300 is conveyed along the rollers 1020 a length of the platform 1002. As the flood table 300 passes over each roller 1020, the weight of the flood table 300 is supported by the roller 1020 and the downward force is detected by the load cell 1010. As such, the weight of the flood table 300 is continuously or discretely detected by the load cells 1010 as the flood table 300 is conveyed along the platform 1002. While each roller 1020 is illustrated as being coupled to the platform 1002 by a load cell 1010, it is contemplated that certain rollers in the system 1000 do not include the load cells 1010. In this embodiment, the yoke 1006 is coupled directly to the platform 1002 and the yoke 1006 is sized and configured to position the wheel 1004 is substantially the same plane as wheels 1004 of adjacent rollers 1020. It is further contemplated that the system 1000 may be utilized in the conveyors 104, 110, 114 and may also find advantageous implementation within the germination station 108 and propagation station 112 of the system 100.

Figure 10B:
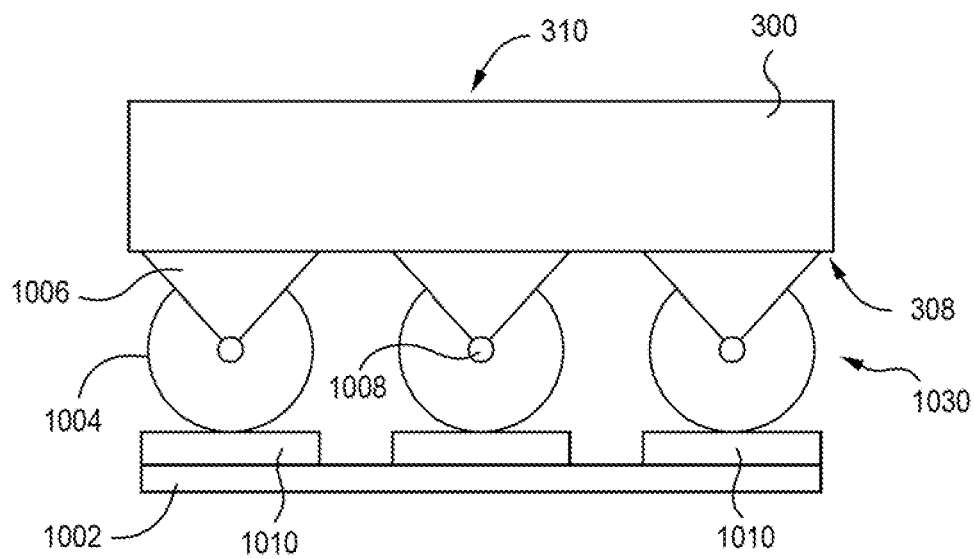
FIG. 10B illustrates a weight measurement system according to an embodiment of the disclosure.

FIG. 10B illustrates a weight measurement system 1030 according to an embodiment of the disclosure. More specifically, FIG. 10B illustrates a schematic side view of the weight measurement system 1030. In the system 1030, the yoke 1006 is coupled directly to the base 308 of the flood table 300 such that the wheels 1004 extend below the yoke 1006. The plurality of load cells 1010 are coupled to the platform 1002. Similar to the system 1000, the load cells 1010 of the system 1030 are compression-type load cells.

In the illustrated embodiment, the load cells 1010 are discrete load cells spaced apart from one another. In this embodiment, spacers 1012 are positioned between adjacent load cells 1010 and the spacer 1010 has a similar thickness to the load cells 1010 to create a smooth surface over which the wheels 1004 roll. The spacers 1012 are configured with any desirable width to space the load cells 1010 apart, depending upon the desired weight detection frequency as the flood table 300 is conveyed along the platform 1002.

In operation, the load cells 1010 detect the weight of the flood table 300 as the wheels 1004 roll across the load cells 1010. The weight of the rollers 1020 are predetermined and subtracted from the gross weight of the flood table 300/rollers 1020 to determine the weight of the flood table 300. It is contemplated that the system 1030 may be utilized in the conveyors 104, 110, 114 and may also find advantageous implementation within the germination station 108 and propagation station 112 of the system 100.

Figure 10C:
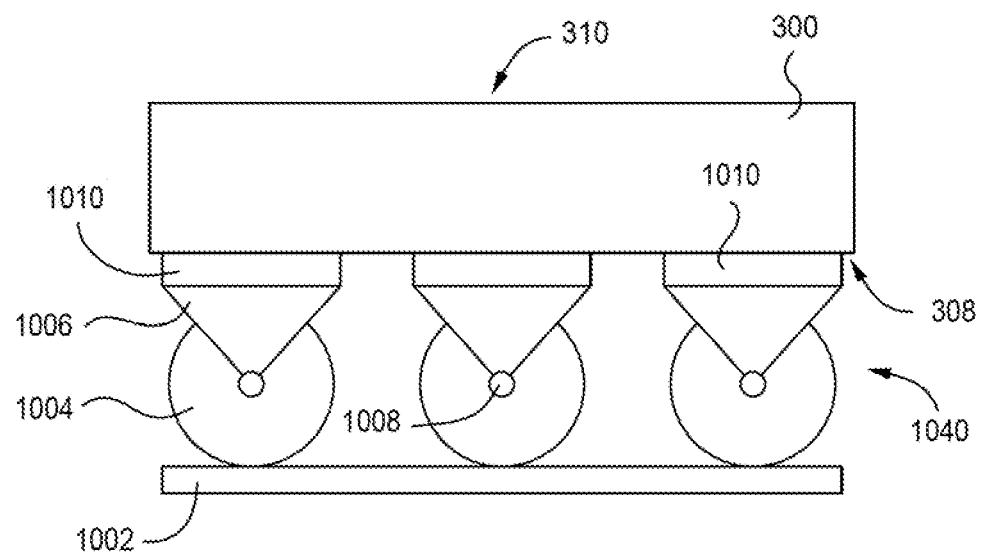
FIG. 10C illustrates a weight measurement system according to an embodiment of the disclosure.

FIG. 10C illustrates a weight measurement system 1040 according to an embodiment of the disclosure. More specifically, FIG. 10C illustrates a schematic side view of the system 1040. In the system 1040, the load cells 1010 are coupled to the base 308 of the flood table 300. The number and spacing of load cells 1010 utilized in the system 1040 are selected based upon several factors, including the number of rollers 1020 utilized, the amount of weight to be supported by the platform 1002, and the number of weight measurements desired. Similar to the systems 1000 and 1030, the load cells 1010 are compression-type load cells.

The yoke 1006 of the rollers 1020 is coupled to the load cell 1010 such that the roller 1020 is oriented in a "wheel down" position. The weight of the flood table 300 is continuously detected by the load cells 1010 as the rollers 1020 convey the flood table 300 along the platform 1002. It is contemplated that the system 1040 may be utilized in the conveyors 104, 110, 114 and may also find advantageous implementation within the germination station 108 and propagation station 112 of the system 100.

Figure 10D:
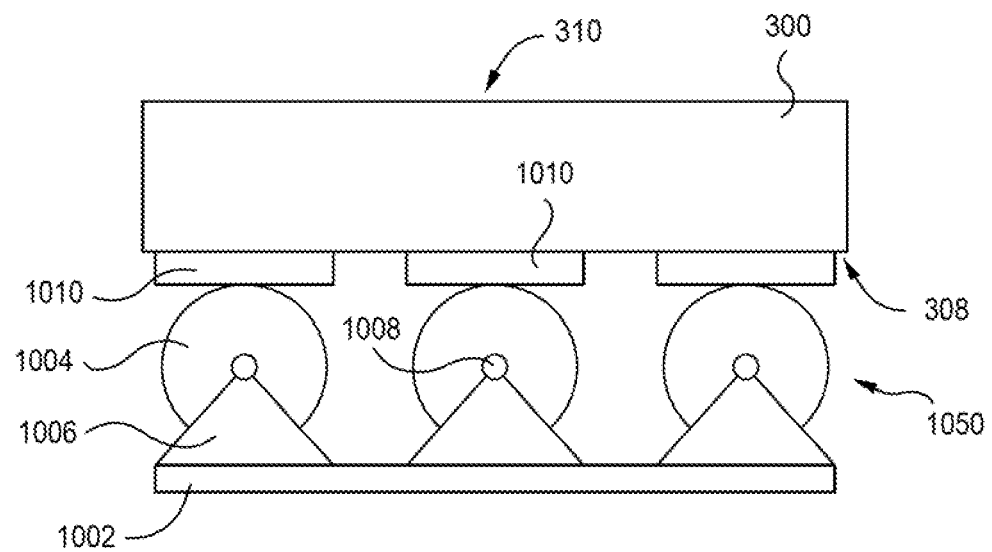
FIG. 10D illustrates a weight measurement system according to an embodiment of the disclosure.

FIG. 10D illustrates a weight measurement system 1050 according to an embodiment of the disclosure. More specifically, FIG. 10D illustrates a schematic side view of the system 1050. In the system 1050, the rollers 1020 are coupled to the platform 1002. The yoke 1006 is coupled directly to the platform 1002 such that the rollers 1020 are oriented in a "wheels up" position. The load cells 1010, which are compression-type load cells, are coupled to the base 308 of the flood table 300. While the illustrated embodiment depicts the load cells 1010 as extending below the base 308, it is contemplated the load cells 1010 are also integrated within the base 308 such that the load cells 1010 are flush with a surface of the base 308. While the load cells 1010 are illustrated a discrete load cells 1010, it is contemplated that a single continuous load cell may be coupled to or integrated in the base 308 of the flood table 300.

The spacers 1012 are positioned between adjacent load cells 1010. Similar to the spacers 1012 described with regard to FIG. 10B, the spacers 1012 have a thickness similar to a thickness of the load cells 1010 to form a substantially planar surface upon which the wheels 1004 support the flood table 300 during conveyance. Similar to the system 1000, 1030, 1040, the system 1050 is utilized in the conveyors 104, 110, 114 and may also find advantageous implementation within the germination station 108 and propagation station 112 of the system 100.

Figure 11A:
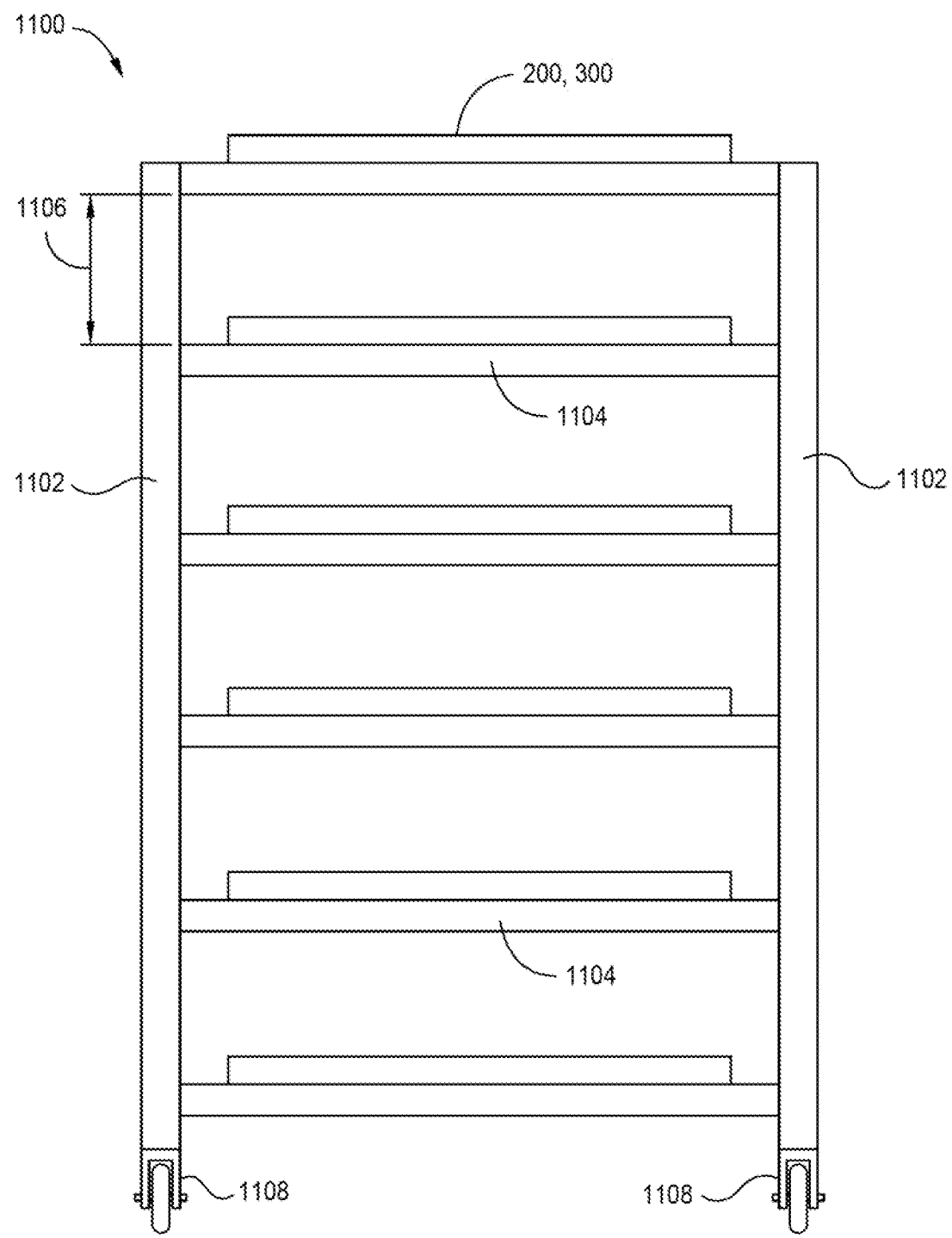
FIG. 11A illustrates a weight measurement system according to an embodiment of the disclosure.

FIG. 11A illustrates a weight measurement system 1100 according to an embodiment of the disclosure. More specifically, FIG. 11A illustrates a schematic side view of the system 1100. The system 1100 includes a plurality of frame members 1102 and a plurality of platforms 1104 which are coupled between each of the frame members 1102. The frame members 1102 and platforms 1104 form vertically stacked support surfaces for a plurality of flood tables 300 and/or seedling trays 200. A distance 1006 between platforms 1104 is sufficient to accommodate loading and unloading of the flood tables 300 and/or seedling trays 200 and accommodate plant growth extending beyond the flood tables 300 and/or seedling trays 200.

The frame members 1102 include casters 1108 or other similar apparatus to enable the system 1100 to be moved or conveyed. In one embodiment, the casters 1108 are optional. The frame members 1102 also include load cells 1101 coupled to a bottom of the frame members 1102. In one embodiment, the load cells 1101 are disposed adjacent and coupled to the casters 1108. The load cells 1101 are compression-type load cells and are configured to measure a weight of the flood tables 300 and/or seedling trays 200 disposed within the system 1100. Accordingly, the system 1100 is utilized to determine a gross weight of all flood tables 300 and/or seedling trays 200 within the system 1100. It is contemplated that additional load cells, such as beam-type load cells are utilized to support each platform 1104 which enables weight measurement of each flood table 300 and/or seedling tray 200 supported within the system 1100.

In one embodiment, the system 1100 may include various elements of the systems 1000, 1030, 1040, 1050. For example, the platform 1104 may be replaced with the platform 1002 and load cells 1010 may be integrated or disposed on the platform 1002. In this embodiment, the platform 1104 is utilized to convey the flood tables 300 and/or seedling trays 200 through the system 1100. Although not illustrated, various lighting apparatus, such as light emitting diodes, and irrigation apparatus may be integrated with the system 1100 utilizing the frame members 1102 and platforms 1104 as structural elements. It is contemplated that the system 1100 may be advantageously implemented within the germination station 108 and propagation station 112 of the system 100.

Figure 11B:
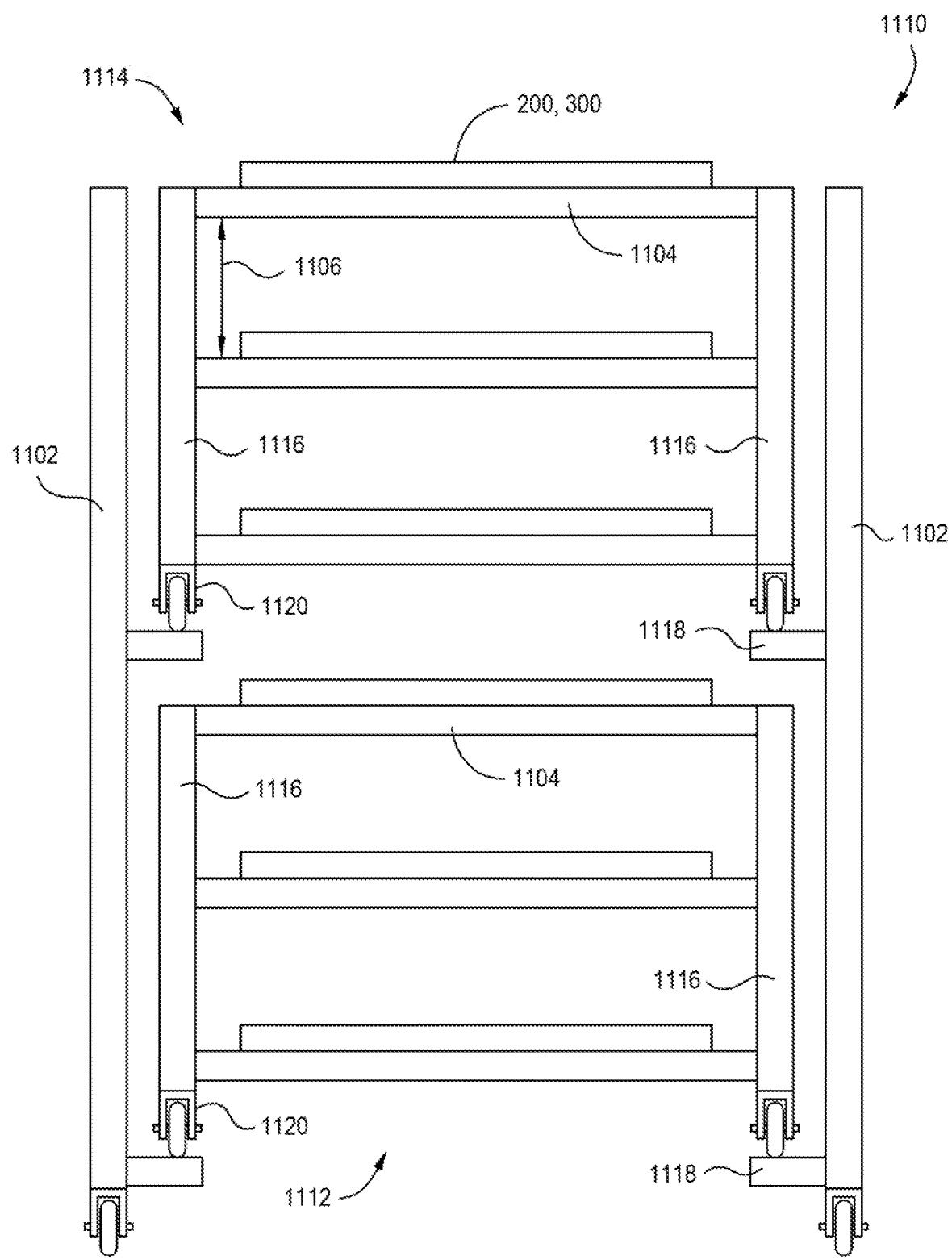
FIG. 11B illustrates a weight measurement system according to an embodiment of the disclosure.

FIG. 11B illustrates a weight measurement system 1110 according to an embodiment of the disclosure. More specifically, FIG. 11B illustrates a schematic side view of the system 1110. The system 1110 includes the frame members 1102 and a plurality of load cells 1118 extending from the frame members 1102. Although not illustrated, support members, such as rails, rods, or the like, may be coupled to and extend between the frame members 1102 to provide structural support and rigidity to the frame members 1102. In one example, multiple pairs of load cells 1118 are coupled to the frame member 1102 and extend toward one another laterally inward from the frame members 1102. The load cells 1118 are beam-type load cells and form a support surface for supporting a subsystem 1112.

The subsystem 1112 includes a plurality of frame members 1116 and a plurality of platforms 1104 which are coupled between the frame members 1116. The frame members 1116 are coupled to casters 1120 or other apparatus to facilitate movement of the subsystem 1112 through the system 1110. In one embodiment, the casters 1120 are optional. By utilizing the subsystem 1112 and the multiple pairs of load cells 1118, increased weight measurement granularity is achieved. It is contemplated that the load cells 1101 of system 1100 may also be implemented within the frame members 1102 of the system 1110 to provide gross system weight measurement.

Similar to the system 1100, the subsystem 1112 may include various elements of the systems 1000, 1030, 1040, 1050. For example, the platform 1104 may be replaced with the platform 1002 and load cells 1010 may be integrated or disposed on the platform 1002. In this embodiment, the platforms 1104 are utilized to convey the flood tables 300 and/or seedling trays 200 through the system 1110. Although not illustrated, various lighting apparatus, such as light emitting diodes, and irrigation apparatus may be integrated with the system 1110 utilizing the frame members 1102, 1116 and platforms 1104 as structural elements. It is contemplated that the system 1100 may be advantageously implemented within the germination station 108 and propagation station 112 of the system 100.

While the foregoing is directed to embodiments of the present disclosure, other and further embodiments of the disclosure may be devised without departing from the basic scope thereof, and the scope thereof is determined by the claims that follow.

What is claimed is:

1. A weight measurement apparatus, comprising:
   a platform comprising a body having a first member and a second member, the second member disposed substantially perpendicular to the first member;

a hinge coupled between the first member and the second member;

a load cell disposed adjacent to the second member of the body opposite the first member;

one or both of a flood table disposed on the second member of the platform body or a seedling tray disposed in the flood table; and a structuring element coupled to the load cell.

2. The apparatus of claim 1, wherein the load cell is a tension load cell coupled to a top surface of the second member.

3. The apparatus of claim 2, wherein a first connector is coupled between the top surface of the second member and the load cell and a second connector is coupled between the load cell and the structuring element.

4. The apparatus of claim 1, wherein the load cell is a compression load cell coupled to a bottom surface of the second member.

5. The apparatus of claim 1, wherein the load cell is a beam load cell coupled to a bottom surface of the second member.

6. A weight measurement apparatus, comprising:

a platform comprising a body having a first end and a second end disposed opposite the first end;

a first load cell coupled to the body adjacent to the first end of the body;

a second load cell coupled to the body adjacent to the second end of the body; and one or both of a seedling tray or flood table disposed on a top surface of the body between the first end and the second end.

7. The apparatus of claim 6, wherein the first load cell is coupled to the body laterally outward of the one or both of a seedling tray or flood table.

8. The apparatus of claim 7, wherein the second load cell is coupled to the body laterally outward of the one or both of a seedling tray or flood table.

9. The apparatus of claim 6, wherein the first load cell and the second load cell are tension load cells.

10. The apparatus of claim 9, wherein a first connector is coupled between the top surface of the body and the first load cell and a second connector is coupled between the first load cell and a structuring element.

11. The apparatus of claim 10, wherein a third connector is coupled between the top surface of the body and the second load cell and a fourth connector is coupled between the second load cell and the structuring element.

12. The apparatus of claim 6, wherein the first load cell and the second load cell are compression load cells.

13. The apparatus of claim 12, wherein the first load cell is disposed between a structuring element and a bottom surface of the body.

14. The apparatus of claim 13, wherein the second load cell is disposed between the structuring element and the bottom surface of the body.

15. The apparatus of claim 6, wherein the first load cell and the second load cell are beam load cells.

16. The apparatus of claim 15, wherein the first load cell and the second load cell are disposed between a structuring element and a bottom surface of the body.

17. A plant carrier weight measurement system, comprising:

a plant carrier comprising at least one of a flood table and a seedling tray;

a first tension load cell coupled adjacent to a first end of the plant carrier, the first tension load cell coupled to a top surface of the plant carrier by a first connector and to a structuring element by a second connector; and a second tension load cell coupled adjacent to a second end of the plant carrier opposite the first end, the second tension load cell coupled to the top surface of the plant carrier by a third connector and to the structuring element by a fourth connector.

* * * * *